US007215446B2

(12) United States Patent  
Ohkawa

(10) Patent No.: US 7,215,446 B2
(45) Date of Patent: May 8, 2007

(54) IMAGE PROCESSING APPARATUS, IMAGE PROCESSING METHOD, PROGRAM FOR EXECUTING IMAGE PROCESSING METHOD, AND STORAGE MEDIUM FOR STORING THE PROGRAM

(75) Inventor: Mieko Ohkawa, Tokyo (JP)

(73) Assignee: Konica Corporation, Tokyo (JP)

( * ) Notice: Subject to any disclaimer, the term of this patent is extended or adjusted under 35 U.S.C. 154(b) by 1043 days.

(21) Appl. No.: 10/197,007

(22) Filed: Jul. 17, 2002

(65) Prior Publication Data

US 2003/0038984 A1 Feb. 27, 2003

(30) Foreign Application Priority Data

Aug. 21, 2001 (JP) ............................. 2001-250104

(51) Int. Cl.
*H04N 1/387* (2006.01)
*G06F 15/00* (2006.01)
(52) U.S. Cl. ...................... 358/452; 358/537; 358/1.15; 353/21; 382/309; 399/182; 399/184
(58) Field of Classification Search ................ 358/462, 358/1.16, 1.15, 452, 505, 408, 474, 486, 358/487, 489, 494, 496, 537; 399/32, 151, 399/202, 209, 186, 83, 211, 200, 182, 184; 313/348, 450; 356/629, 479; 700/17; 400/697; 382/163, 282, 309; 353/21
See application file for complete search history.

(56) References Cited

U.S. PATENT DOCUMENTS 4,870,500 A 9/1989 Nagashima

| 5,177,621 | A | * | 1/1993 | Ohtaki et al. ............... 358/406 |
| 5,510,908 | A | | 4/1996 | Watanabe et al. |
| 5,526,445 | A | * | 6/1996 | Smutek et al. .............. 382/237 |
| 5,629,777 | A | | 5/1997 | Moro |
| 5,677,776 | A | * | 10/1997 | Matsuda et al. ............ 358/475 |
| 5,699,454 | A | * | 12/1997 | Nakai et al. ................ 382/172 |
| 5,790,262 | A | | 8/1998 | Kanno |
| 7,099,041 | B1 | * | 8/2006 | Moriya et al. ............... 358/1.9 |

FOREIGN PATENT DOCUMENTS

| JP | 07-111579 | 4/1995 |
| JP | 07-307856 | 11/1995 |
| JP | 2002-084409 A | 3/2002 |

* cited by examiner

*Primary Examiner*—Twyler Lamb
*Assistant Examiner*—Steven Kau
(74) *Attorney, Agent, or Firm*—Frishauf, Holtz, Goodman & Chick, P.C.

(57) ABSTRACT

In an image processing apparatus including an image reading section, an image processing section to distinguish an area where a document exists from an area where the document does not exist according to an output of the image reading section on the basis of an area recognition threshold value, and a document erasure device to erase an output image for an area on a recording material corresponding to the area where the document does not exist, a selector automatically selects either a rectangle erasure function in which an area inside a minimum quadrilateral including the document is made a document area or an oblique angle erasure function in which the document area is formed by both edges of each primary scanning line of the document read by the image reading section, on the basis of a rectangle erasing threshold value and a document background level value.

18 Claims, 21 Drawing Sheets

IMAGE PROCESSING APPARATUS, IMAGE PROCESSING METHOD, PROGRAM FOR EXECUTING IMAGE PROCESSING METHOD, AND STORAGE MEDIUM FOR STORING THE PROGRAM

BACKGROUND OF THE INVENTION

The present invention relates to an image processing apparatus, and particularly to an image processing apparatus having an erasure means by which unnecessary image formation about an area outside the document is not conducted.

As the conventional image processing apparatus, for example, a copier by which a reflected light acquired by projecting the light emitted from a light source onto a document placed on, for example, a platen glass is converted (image reading)into an electric signal (document image data) by an electric light conversion element, and by this electric signal, a semiconductor laser is driven and an electrostatic latent image is formed on a photoreceptor, and a toner adhered to the electrostatic latent image is transferred onto a recording material, and the document is copied, is proposed.

In this connection, in the conventional image processing apparatus, as a function relating to the document reading, as disclosed in, for example, Japanese Patent Tokkaihei No. 7-307856 or Tokkaihei NO. 7-111579, a copier having a so-called "outside of the document erasure function" is proposed. This outside of the document erasure function is conceptually a function by which, as shown in FIG. 19, relating a document S placed on the platen glass 11, from the density in an area in which the document S exists (in the drawing, a slanting line portion attached with a mark SR, hereinafter called "document area SR") and the density in an area in which the document S does not exist (in the drawing, a portion attached with a mark SR, hereinafter called "outside document area NSR"), both area are distinguished, and according to the distinction, relating to the outside document area NSR, the image formation is conducted onto the recording material with white (without transferring the toner).

In this connection, when the outside of the document erasure function is used, in order that the distinction of the document area SR and the outside document area NSR may be more securely conducted, normally, it is made in a condition that a platen cover normally provided so as to cover the platen glass 11 is opened, and relating to the outside document area NSR, it is made in a condition such that the so-called sky shot is conducted. In this connection, the sky shot means that the light is projected to an area in which nothing to reflect the light of the light source exists, and therefore, the reflected light intensity becomes almost zero.

When such the outside of the document erasure function is used, the information relating to a useless area except the document S is not outputted on the recording material (a solid black output according to the sky shot), and the copy processing of the bad appearance is not conducted, and further, the large amount consumption of the toner accompanied by the solid black output can be avoided.

In this connection, the recognition of the "density" to distinguish the document area SR from the outside document area NSR is generally conducted as follows according to the official gazettes. That is, initially, the reflected light and the luminance data as its electric signal are acquired for the first line of the primary scanning direction MS shown together in FIG. 19. This luminance data value is made the binary coded data divided into a document background data value (for example, "1") relating to the document area SR and a non-document background data value (for example, "0") relating to the outside document area NSR according to whether it is higher or lower than a threshold level which is a predetermined fixed value. The acquirement of this binary coded data is successively conducted, for example, from the first line on, the first line shown in FIG. 19, . . . , m line, . . . , n line, and a logical sum is acquired for the before data at every time of the data acquirement for each line, and by the logical sum, the binary coded data is successively renewed in a line memory. Then, in the finally acquired binary coded data, the two positions in which the document background data values which are most separated from each other in its primary scanning direction MS exist, are recognized as positions to form the document areas SR in the left and right directions in FIG. 19.

Such a condition is easily understood when, for example, as shown in FIG. 20, the document S0 whose shape is an irregular shape, is presumed. In this drawing, it is found that the document background data value which is confirmed in the most separated position in the primary scanning direction MS is the "1-th line", and further, the binary coded data acquired at this time point, is, so to call it, "saved" (because the logical sum is conducted) until the final m-th line data in which the document S0 exists is renewed. Accordingly, both end points of the 1-th line are recognized as the points at which they form the document area SR relating to the primary scanning direction MS (refer to a dotted line in FIG. 20).

On the one hand, together with such the recognition processing of the document area SR relating to the primary scanning direction MS, both end positions in the foremost primary scanning line which is recognized that the document background data value exists (the 1-th line in FIGS. 19 and 20) and the secondary scanning direction AS in which the final primary scanning line (similarly, the m-th line in FIGS. 19 and 20) positions, are stored. Then, it is recognized that an area sandwiched by both end positions form the document areas SR in the upper and lower directions in FIGS. 19 and 20 (definite form erasure). Hereinafter, "the definite form erasure" is called "the rectangle erasure".

Further, as described above, other than a method (the rectangle erasure) by which the area sandwiched by the primary scanning direction MS both end positions and the secondary scanning direction AS both end positions recognizes the document area SR, a method by which, from the binary coded data acquired for each line of the primary scanning direction MS, an area between positions at which the document background data values are most separated on the line of the primary scanning direction MS, is confirmed as the document area SR in the line and this confirmation is conducted for each line and the document area SR is recognized, is also proposed (indefinite form erasure). Hereinafter, the "indefinite form erasure" is called an "oblique angle erasure". According to this method, even when it is an irregular shaped document as shown in FIG. 20, the document area SR can be recognized. A slanting line portion in FIG. 20 can be recognized as a portion which forms the document area SR.

However, there is a following problem for the above outside of the document erasure function. For example, when the density of the background of the document S is darker, even when the threshold level is set to the darker, when the oblique angle erasure is used, because the density difference between the background of the document S and the outside document area NSR is small, the background of the document S is wrongly recognized as the outside document area NSR, and by the outside of the document erasure, there is a case where the image is cut. In this case, when the rectangle erasure is used, even when it is wrongly recognized at several portions, because there is no case where it is wrongly recognized at all portions, the primary scanning direction MS both end positions and the secondary scanning direction AS both direction positions are recognized, and as a result, there is no case where the image is cut.

However, in the rectangle erasure, for example, 4 triangle portions other than the slanting line portion of an area surrounded among the dotted line showing the primary scanning direction document area in FIG. 20 and an 1 line and an m line, are outputted in the black solid portion (the density of the outside document area). In this case, when the density of the background of the document S is lighter, the image is of bad appearance.

Accordingly, when the failure is generated, because the user of the apparatus repeats changing the outside of the document erasure function setting and re-copying it, the uselessness is generated.

Further, when the threshold level is set to darker, for example, the external light such as the sun light incident from the window or the fluorescent lamp light arranged on the ceiling, is incident onto the image reading section, (for example, ≈255), and thereby, there is a case where the document area SR is erroneously recognized, and there is also a failure in which the unnecessary image which is quite unexpected is formed on the recording material.

SUMMARY OF THE INVENTION

The present invention is attained in view of the above conditions, and its object is to provide an image processing apparatus by which a "document background level value" which is the reference to select and set any one of a rectangle erasure and an oblique angle erasure, can be adequately set, and further, from the set "document background level value", the selection of an adequate outside of the document erasure method can be conducted, thereby, the realization of the more accurate outside of the document erasure function can be attained.

In order to solve the above problems, the present invention has the following structures (1)–(19).

That is, an image processing apparatus of structure (1) comprises: an image reading section by which an image formed on the document can be read, and an image processing section by which an area in which the document exists and an area in which the document does not exist is distinguished and recognized according to the output of the image reading section on the basis of an area recognition threshold value, and in the image processing apparatus having an erasure means to erase an output image for an area on the recording material corresponding to the area in which the document does not exist, the image processing apparatus is characterized in that: the erasure means has a rectangle erasure function in which the inside of the minimum quadrilateral including the document is made a document area, and an oblique angle erasure function by which the document area is formed by edges of the document which is read by the image reading section, and there is provided with a selection means to automatically select either one of the rectangle erasure function or the oblique angle erasure function according to a rectangle erasure threshold value and a document background level value.

Further, an image processing apparatus of structure (2) comprises: an image reading section by which an image formed on the document can be read, and an image processing section by which an area in which the document exists and an area in which the document does not exist according to the output of the image reading section is distinguished and recognized on the basis of an area recognition threshold value, and in the image processing apparatus having an erasure means for erasing an output image for an area on the recording material corresponding to the area in which the document does not exist, the image processing apparatus is characterized in that; the erasure means has a rectangle erasure function in which the inside of the minimum quadrilateral including the document is made a document area, and an oblique angle erasure function in which the document area is formed by edges of the document which is read by the image reading section, and there is provided a manual selection means for selecting any one of the rectangle erasure function, the oblique angle erasure function, or the automatic selection of the rectangle erasure function and the oblique angle erasure function.

Further, an image processing apparatus of structure (3) is characterized in that: the document background level value is automatically set according to a characteristic grasped by an output of the image reading section.

Further, an image processing apparatus of structure (4) is characterized in that: the image reading section has the light source which emits the light to be projected onto the document, and a photoelectric conversion apparatus by which the light reflected by the document is converted into an electric signal, and the output of the image reading section is a luminance data value which is an output of the photoelectric conversion apparatus, and the characteristic is a histogram data in which its frequency is totalized corresponding to the distinction of the luminance data value or the density data value into which the luminance data value is converted.

Further, an image processing apparatus of structure (5) comprises: an image reading section which can read out the image formed on the document, and an image processing section to distinguish and recognize an area in which the document exists from an area in which the document does not exist, according to the output of the image reading section on the basis of the area recognition threshold value, and in the image processing apparatus having an erasure means for erasing the output image for an area on the recording material corresponding to the area in which the document does not exist, the image processing apparatus is characterized in that; the image reading section has the light source which emits the light to be projected to the document placed on the document glass, and the photoelectric conversion apparatus by which the light which is reflected by the document is converted into an electric signal, and the erasure means has a rectangle erasure function in which the inside of the minimum quadrilateral including the document is made a document area, and the oblique angle erasure function by which the area is formed by edges of the document read out by the image reading section, and a selection means for automatically selecting either one of the rectangle erasure function or the oblique angle erasure function on the basis of the rectangle erasure threshold value and the document background level value, wherein the selection means automatically selects the rectangle erasure function when the document background level value set automatically from a histogram data in which its frequency is totalized in accordance with either the luminance data value which is an output of the photoelectric conversion device or a density data value which is converted from the luminance data value, is set beyond an external light level acquired on the basis of the output of the photoelectric conversion device, or when the setting is assumed.

Further, an image processing apparatus of structure (6) is characterized in that: the document background level value is automatically set according to the luminance data value relating to a peak observed in the histogram data or the density data value.

Further, an image processing apparatus of structure (7) is characterized in that: the peak is a peak which appears as the first place peak, except the peak which appears by a sky shot, in the peak observed in the histogram data.

Further, an image processing apparatus of structure (8) is characterized in that: the peak is a peak on the side at which the luminance value is low or the density is high, of the peak which appears as the first place and the second place peaks, except the peak which appears by a sky shot, in the peak observed in the histogram data.

Further, an image processing apparatus of structure (9) is characterized in that: the document background level value is set from the difference value of frequency and the specified difference value which are calculated according to the luminance data value or density data value relating to the vicinity of the peak observed in the histogram data.

Further, an image processing apparatus of structure (10) comprises: an image reading section which can read the image formed on the document; and an image processing section to distinguish and recognize an area in which the document exists from an area in which the document does not exist, with reference to an area recognition threshold value on the basis of an output of the image reading section, and in the image processing apparatus having the erasure means for erasing the output image for an area on the recording material corresponding to the area in which the document does not exist, the image processing apparatus is characterized in that; the image reading section has the light source which emits the light to be projected to the document placed on the document glass, and the photoelectric conversion apparatus by which the light which is reflected by the document is converted into an electric signal, and the erasure means has a rectangle erasure function in which an area inside a minimum quadrangle including the document is made a document area, and the oblique angle erasure function by which the area is formed by edges of the document for each primary scanning line read out by the image reading section, and a selection means for automatically selecting either one of the rectangle erasure function or the oblique angle erasure function on the basis of a rectangle erasure threshold value and a document background level value, is provided, and the selection means automatically selects the rectangle erasure function when the document background level value set from a difference value of frequency and a specified difference value calculated on the basis of the luminance data value or the density data value relating to the vicinity of the peak observed in the histogram data in which its frequency is totalized in accordance with either the luminance data value which is an output of the photoelectric conversion device or the density data value which is converted from the luminance data value, is not set.

Further, an image processing apparatus of structure (11) is characterized in that: the document background level value is set from a changing point of the large and small relationship of the difference value of frequency and the specified difference value calculated according to the luminance data value or the density data value relating to the vicinity of the peak observed in the histogram data.

Further, an image processing apparatus of structure (12) is characterized in that: the document background level value is, instead of the peak or together with the peak, automatically set by using more than one of the maximum point, minimum point, inflection point, foot in the vicinity of the peak, and under peak.

Further, an image processing apparatus of structure (13) is characterized in that: the area recognition threshold value and the document background level value are the same.

Further, an image processing apparatus of structure (14) is characterized in that: the threshold value set by the image processing apparatus written in any one of structures (1)–(13) is made the reference, and the function to distinguish and recognize an area in which the document exists, from an area in which the document does not exist, is applied to a repeat function to extract the document area and to repeatedly form a plurality of document images on the output image, or a document position correction function to extract the document area and to move the document image.

Further, an image processing apparatus of structure (15) is characterized in that: the image reading section has a light source which emits the light to be projected onto the document, and a photoelectric conversion apparatus by which the reflected light by the document is converted into an electric signal, and in the output of the image reading section, when the light source is acquired by being scanned in a predetermined direction to the document, the information necessary for the acquirement of the characteristic grasped by the output of the image reading section, automatic setting of the threshold value and the distinction and recognition in the image processing section, is acquired by only one execution of the scanning.

Further, an image processing method of structure (16) is characterized in that: in an image processing method by which the image formed on the document is read by the image reading section, and by the erasure means, an area in which the document exists from an area in which the document does not exist is distinguished and recognized by making the area recognition threshold value as the reference, and the output image for an area on the recording material corresponding to the area in which the document does not exist is erased, the erasure means has the rectangle erasure method in which the inside of the minimum quadrilateral including the document is made the document area, and the oblique angle erasure method by which the area is formed for each primary scanning line by edges of the document read out by the image reading section, and has a step in which either one of the rectangle erasure method or the oblique angle erasure method is automatically selected according to the rectangle erasure threshold value and the document background level.

Further, an image processing apparatus of structure (17) is characterized in that: in an image processing method by which the image formed on the document is read by the image reading section, and by the erasure means, an area in which the document exists from an area in which the document does not exist is distinguished and recognized by making the area recognition threshold value as the reference, and the output image to the area on the recording material corresponding to the area in which the document does not exist is erased, the erasure means has the rectangle erasure method in which the inside of the minimum quadrilateral including the document is made the document area, and the oblique angle erasure method by which the area is formed for each primary scanning line by edges of the document read out by the image reading section, and has a step in which any one of the rectangle erasure method, the oblique angle erasure method, or the automatic selection of the rectangle erasure method and the oblique angle erasure method, is manually selected.

Further, an image processing apparatus of structure (18) is characterized in that it is a program for conducting the image processing method written in either one of structure (16) or (17).

Further, an image processing apparatus of structure (19) is characterized in that it is a storage medium in which the program written in the structure (18) is stored.

BRIEF DESCRIPTION OF THE DRAWINGS

FIG. 8(a) shows the document, FIG. 8(b) shows a rectangle erasure, and FIG. 8(c) shows an oblique angle erasure.

DETAILED DESCRIPTION OF THE PREFERRED EMBODIMENT

Figure 1:
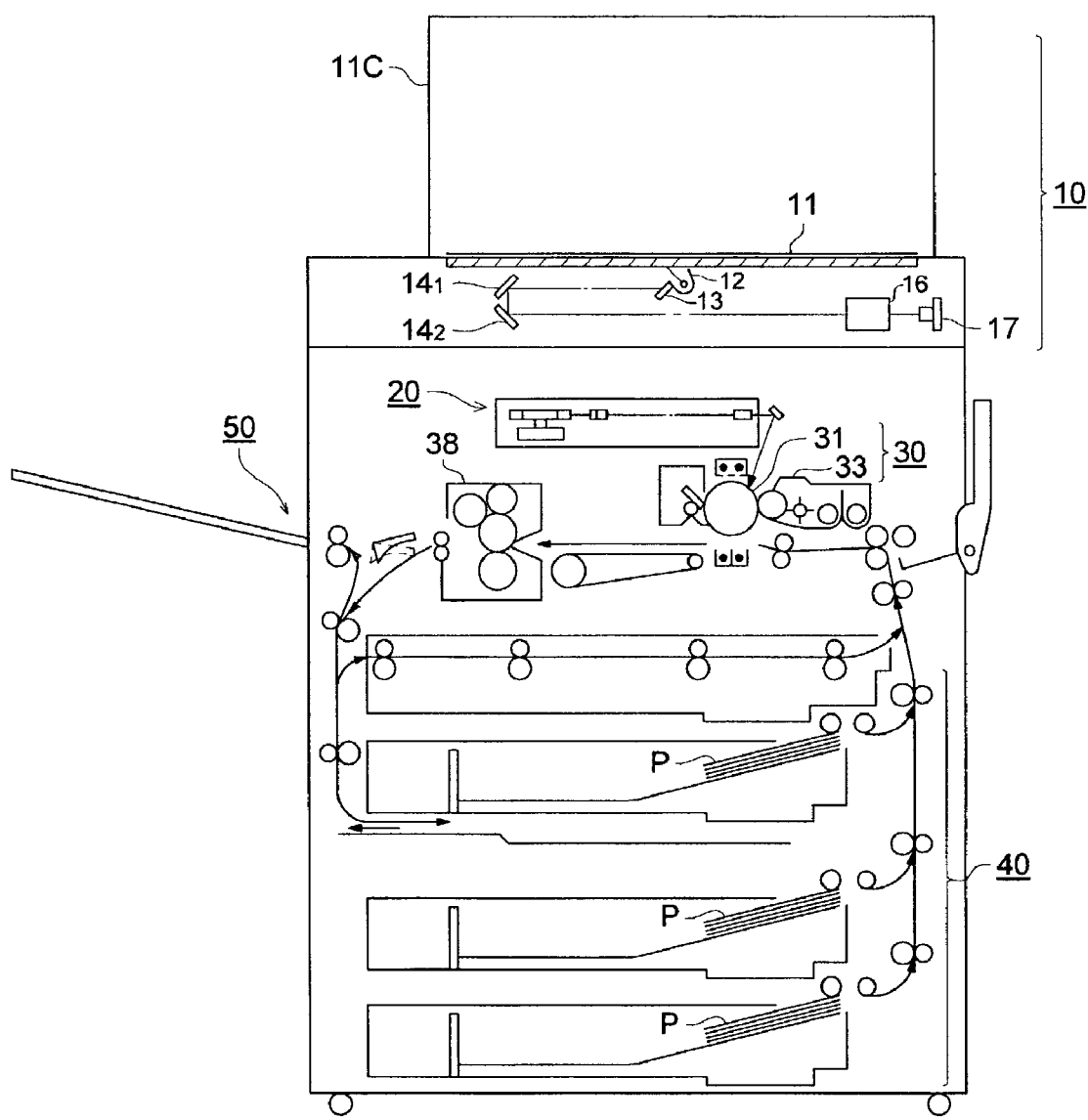
FIG. 1 is a general view showing a mechanical structural example of a copier according to an embodiment of the present invention.
Figure 19:
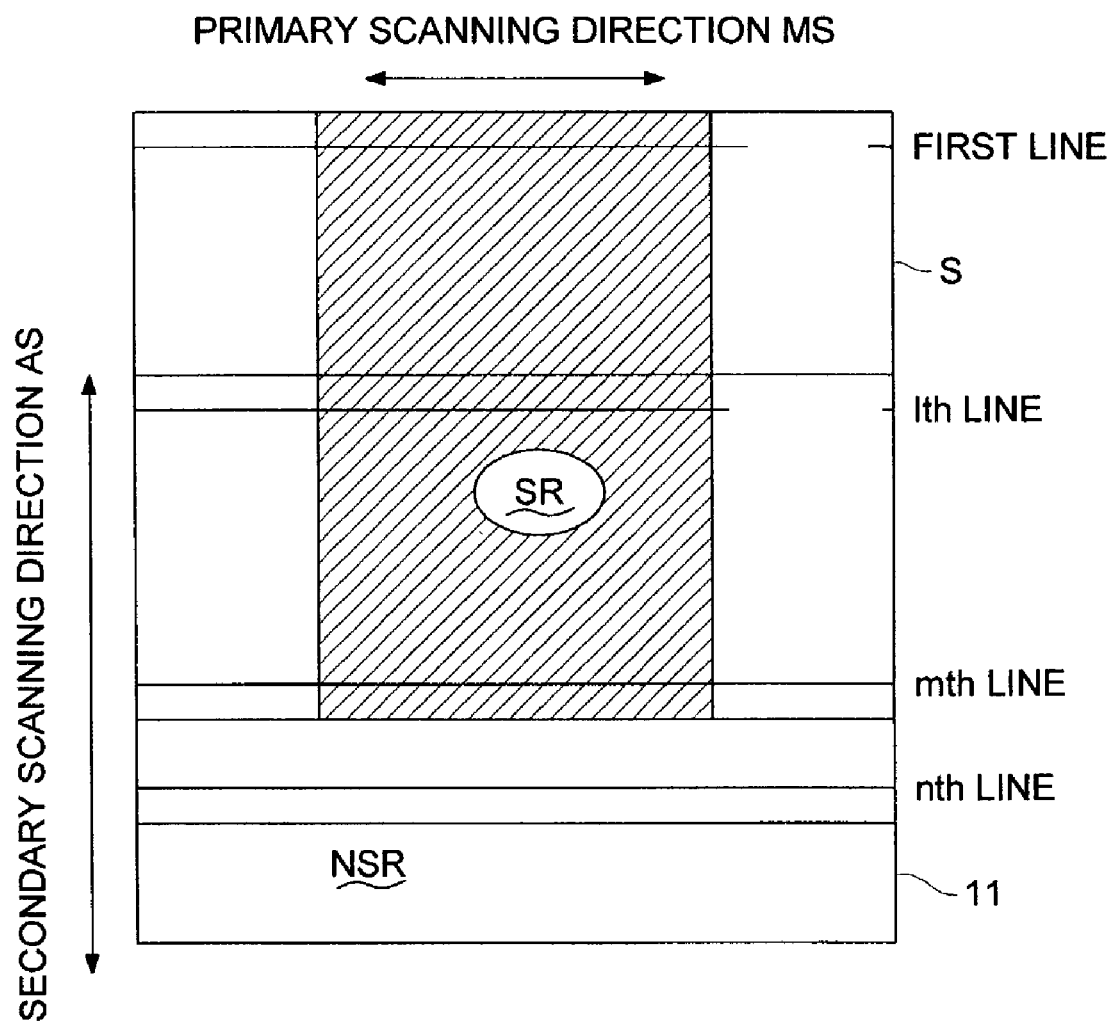
FIG. 19 is an illustration for explaining the conventional outside of the document erasure function.
Figure 20:
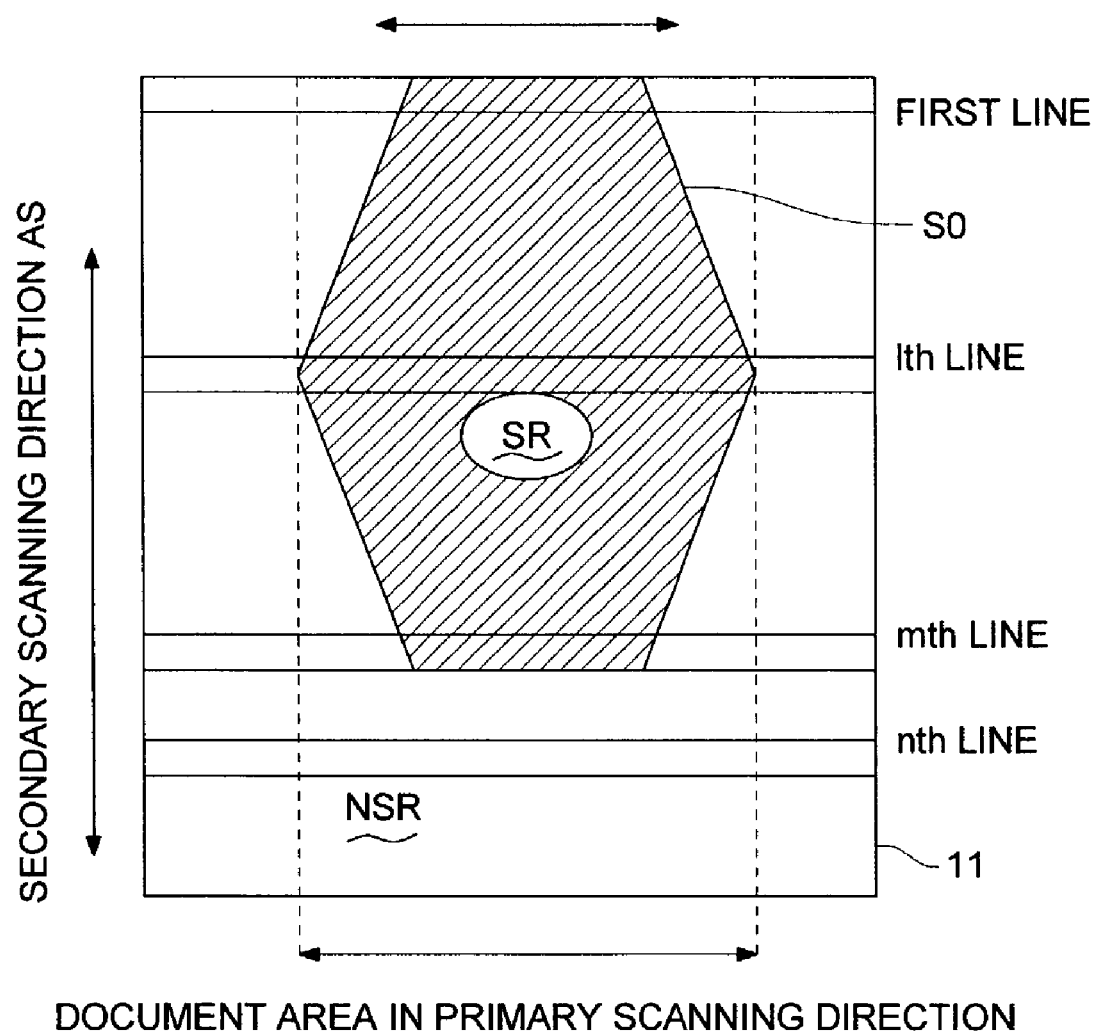
FIG. 20 is a view of the same object to FIG. 19.

In the below, referring to the drawings, embodiments of the present invention will be described. FIG. 1 is a general view showing a mechanical structural example of a copier (image processing apparatus) according to the present embodiment. In FIG. 1, the copier is largely composed of an image reading section 10, image processing section J which is not shown, image writing section 20, image forming section 30, transfer sheet conveying section 40, and transfer sheet ejection section 50. In this connection, in the drawings referred to below, when the numerical codes indicate the same object and conception in which numerical codes used in FIG. 19 and FIG. 20 which is referred to in an item of the prior art indicate, the same numerical code is used.

The image reading section 10 is a section which reads a character row or the pictures as the optical information by the irradiation light of the light source, and converts it into an electric signal (document image data).

The document S is directly placed on a platen glass 11 so that its document surface (the surface on which the image is formed) is opposite to the platen glass 11 surface. The light source 12 projects the light onto the placed document surface. The light reaches the document surface becomes the light (information) including the image information, and is reflected on the surface and reaches a mirror 13. In this connection, the light source 12 and the mirror 13 are structured in such a manner that they can move along the platen glass 11 surface so that they scan on the whole of the document surface. Further, as the specific structure of the light source 12, for example, a halogen lamp or xenon lamp is used.

As described above, the optical information according to the document surface read out by the light source 12, hereinafter, repeats the reflection on the mirror $14_1$ and $14_2$, and reaches a CCD image pick-up apparatus 17 through an image formation optical system 16.

The CCD image pick-up apparatus 17 has a photoelectric surface (not shown) in which a plurality of pixels having the photoelectric conversion function are arranged, for example, one dimensionally, and by the plurality of pixels, the optical information including the image information of the document surface is received and this is converted into the electric signal (document image data).

Figure 2:
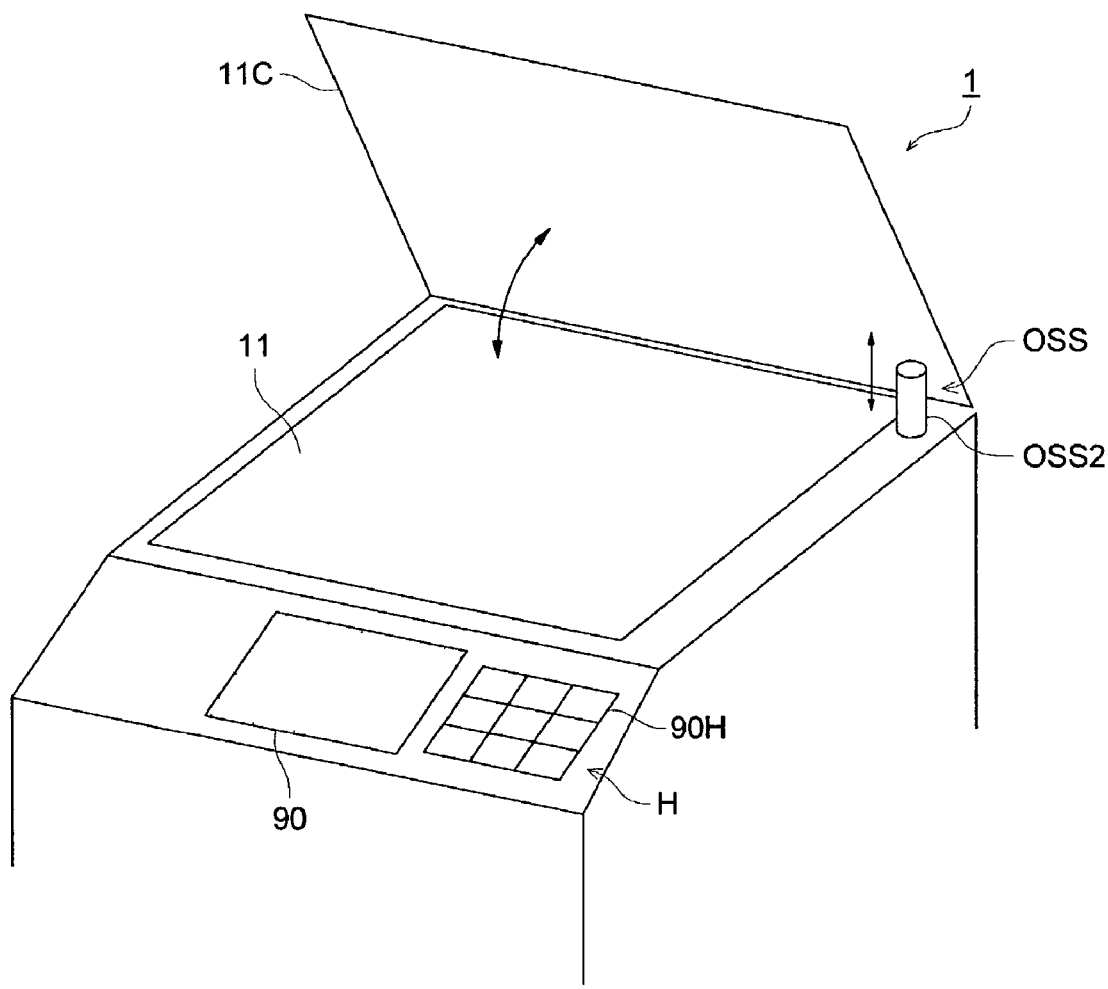
FIG. 2 is a perspective view showing an external appearance of the periphery of an image reading section of the copier shown in FIG. 1.

In this connection, in a copier 1 in the present embodiment, as shown in FIG. 1 or FIG. 2, its one side is arranged so as to be almost coincide with a one side of a platen glass 11, and an axis on the one side is made a central axis and a platen cover 11C rotatably connected to the copier 1 main body is provided. According to this platen cover 11C, its whole surface can be covered so that the external light is not incident onto the platen glass 11 surface.

Figure 3:
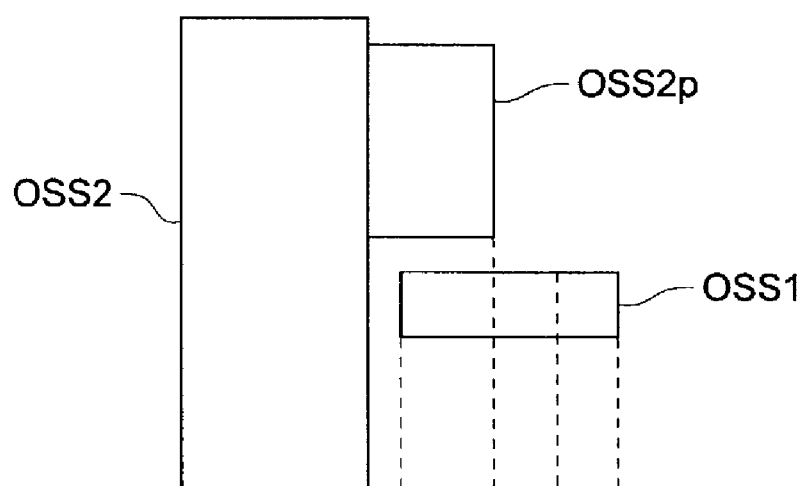
FIGS. 3(a) and 3(b) are general views showing the external appearance of a cover detection sensor provided on the image reading section.
Figure 3:
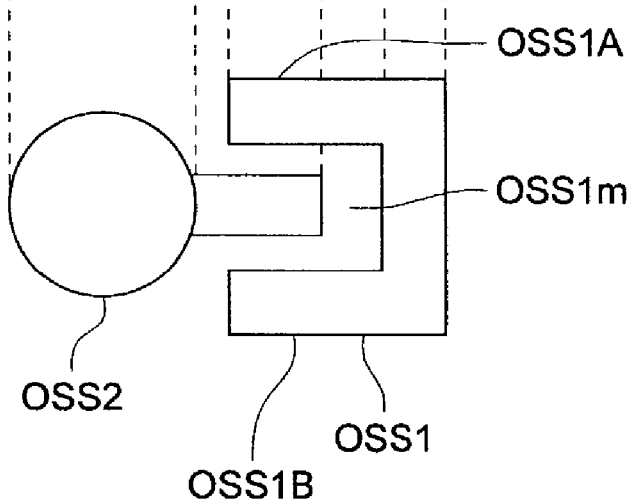

Further, relating to the platen cover 11C, a cover detection sensor OSS to detect whether the cover 11C covers on the platen glass 11, is provided. This cover detection sensor OSS, for example, as shown in detail in FIG. 3, is structured by a photo sensor OSS1 whose cross section is about C-shaped, and a dog chuck OSS2 which is cylinder-like including a protrusion OSS2p protrusively provided on its side surface. Then, respectively, a light emitting portion, not shown, is provided on one arm OSS1A forming an opening OSS1m of the photo sensor OSS1, and a light receiving portion, not shown, is provided on the other arm OSS1B.

In such the cover detection sensor OSS, when the platen cover 11C is closed, the top end of the dog chuck OSS2 is pushed to a lower portion in FIG. 3(a), thereby, its protrusion OSS2p passes inside the U-shaped opening OSS1m in the photo sensor OSS1, and blocks the light of the light emitting portion, and inversely, when the cover 11C is opened, the dog chuck OSS2 is pushed to the upper portion in FIG. 3(a) by the urging of a spring, not shown, provided on its foot end, thereby, its protrusion OSS2p passes through the opening OSS1m and the light of the light emitting portion reaches the light receiving portion. These both operations, the copier 1 can detect the open and close of the platen cover 11C.

When relating to the remaining image processing section J, image writing section 20, image forming section 30, transfer sheet conveying section 40 and transfer sheet ejection section 50, when these are collectively briefly described below, the image processing section J conducts each kind of image processing on the electric signal (document image data) sent from the CCD image pick-up apparatus 17. The image writing section 20 has a semiconductor laser, not shown, and according to the electric signal sent from the image processing section J, its laser oscillation mode is controlled. This controlled laser beam forms an electrostatic latent image relating to the document image on a photoreceptor drum 31 constituting the image forming section 30. Then, the image forming section 30 adheres the toner onto the electrostatic latent image by the developing section 33 and this is visualized, and after that, the toner is transferred onto the transfer sheet P fed from the transfer sheet conveying section 40, and the toner image is formed on the transfer sheet P surface. The transfer sheet P is, after this, passes through the fixing section 38 and the fixing of the transferred toner is conducted, and through a plurality of rollers constituting the transfer sheet ejection section 50, the transfer sheet P is delivered to the outside of the copier.

Figure 4:
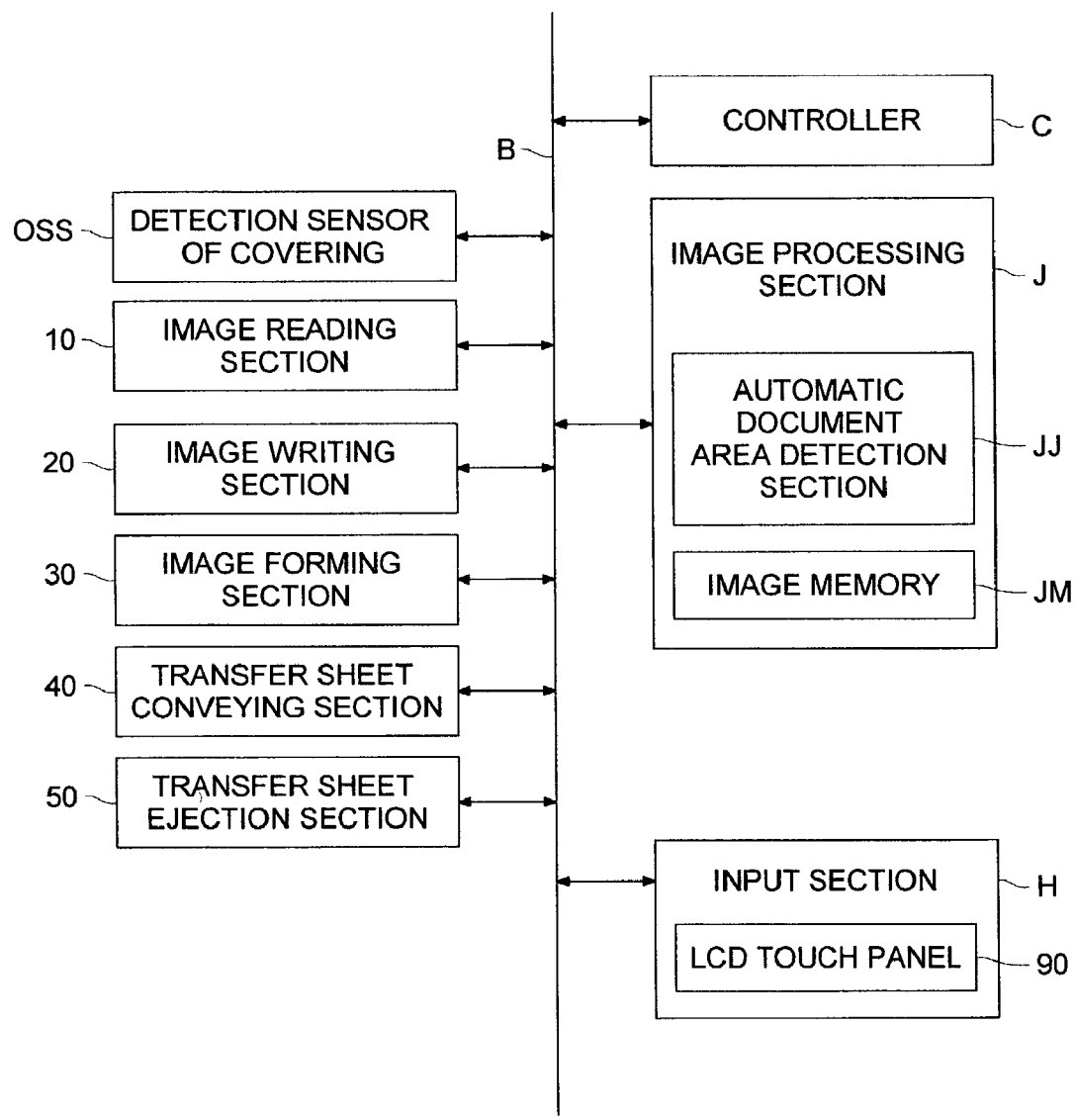
FIG. 4 is a general view showing an electrical structural example of the copier shown in FIG. 1.

The electric structural example of the copier which will be the above structural example, will be described below. The image reading section 10, image processing section J, image writing section 20, image forming section 30, transfer sheet conveying section 40 and transfer sheet ejection section 50, and many other kind of mechanisms such as cover detection sensor OSS, as shown in FIG. 4, are controlled by the control section C through a data bus B.

In FIG. 2, further, the image processing section J to conduct each kind of processing relating to the document image data according to the content of the document read out by the image reading section 10, is connected. In the present embodiment, particularly, this image processing section J is characterized in that it conducts each kind of processing in order to realize the outside of the document erasure function (erasure means).

Figure 5:
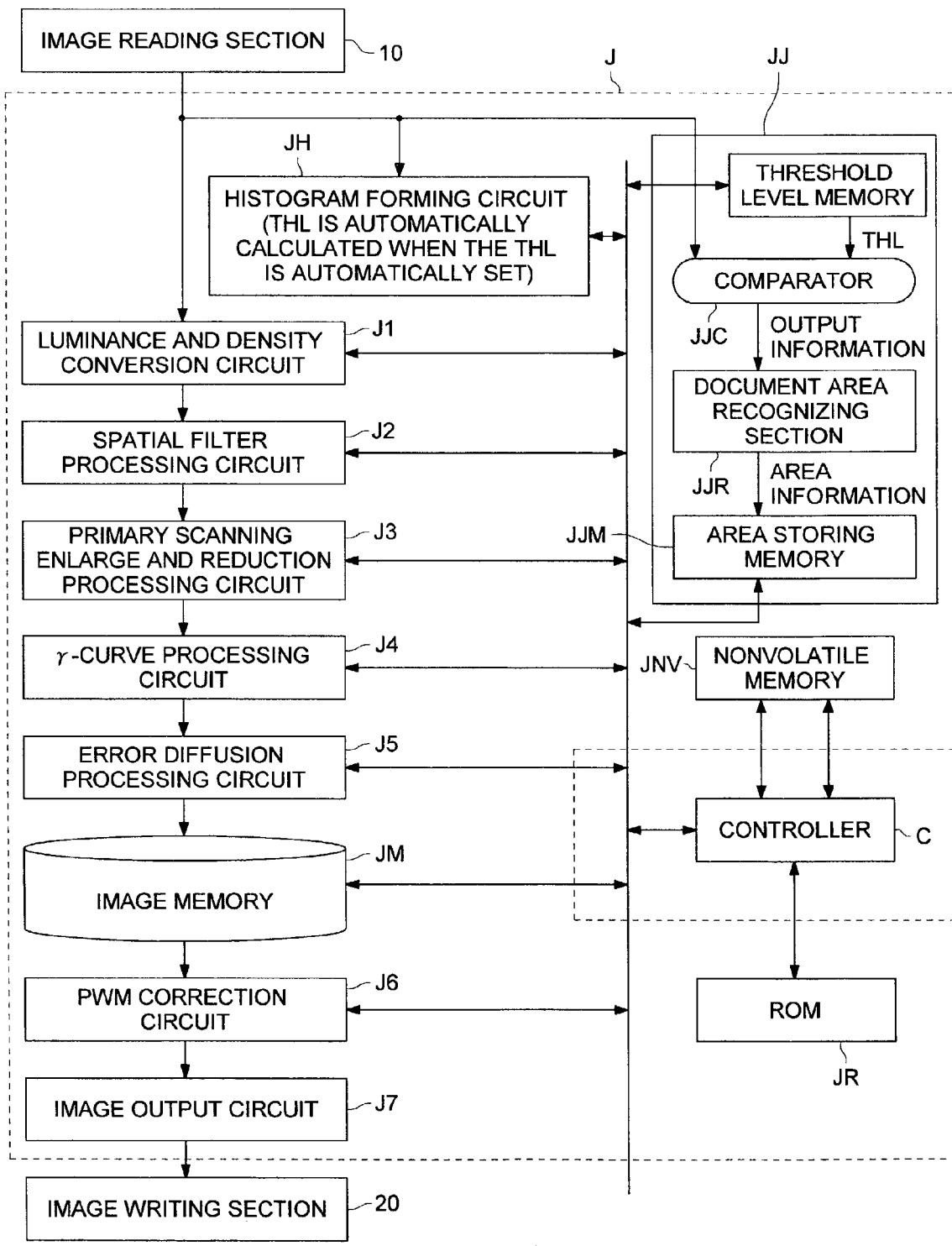
FIG. 5 is an illustration showing a circuit structural example of an image processing section shown in FIG. 1.

In more details, this image processing section J is structured as the block diagram shown in, for example, FIG. 5. In FIG. 5, the document image data read in by the image reading section 10 is inputted into the luminance-density conversion circuit J1, histogram forming circuit JH and one end of a comparator JJC in the document area detection section JJ. In them, the latter two are the structures relating to the above outside of the document erasure processing, and these operations will be described at the time of the description of the operation.

Figure 6:
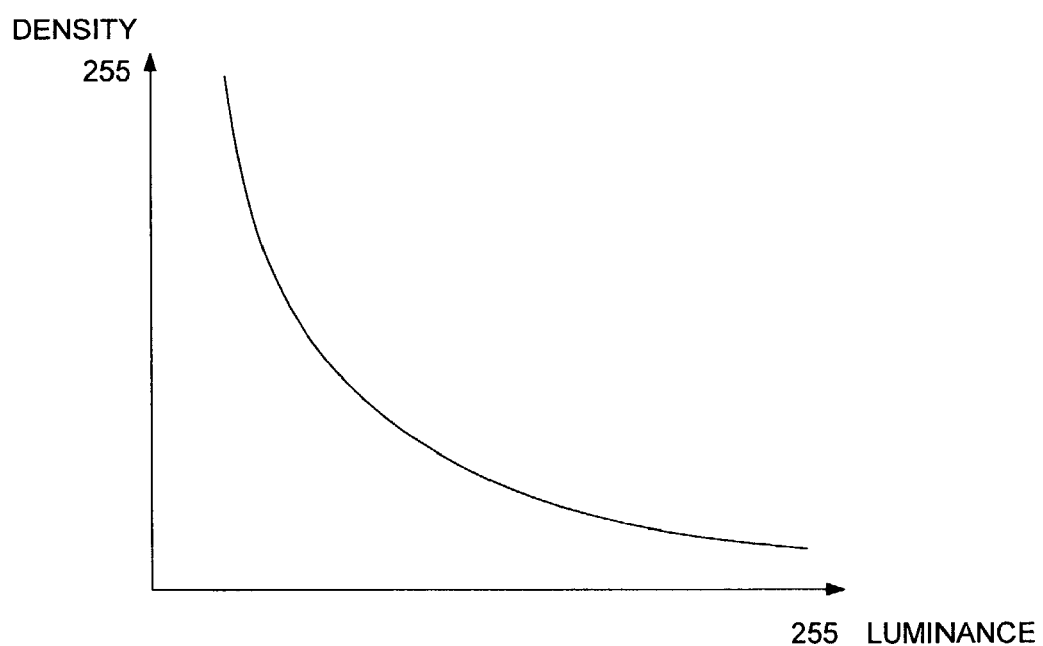
FIG. 6 is a graph showing the relationship between a luminance value and a density value of a document read out by the image reading section.

Herein, a circuit structure and its operation relating to the general processing flow until the document image data is sent to the image writing section 20, will be described. Initially, the document image data is inputted into the luminance-density conversion circuit J1, and generally, the document image data acquired as the luminance data is converted into the density data and outputted. In this connection, it is well known that, between these luminance and density, the description is possible by the relationship when one (luminance or density) is determined, the other (density or luminance) is also unconditionally determined. Accordingly, more specifically, there is no difference in kind between the two. In this connection, more specifically, the operation between the luminance-density is described by the logarithmic conversion as shown in FIG. 6.

A spatial filter processing circuit J2 conducts the appropriate spatial filtering processing on the document image data of the density expression outputted from the luminance-density conversion circuit J1. That is, the processing to emphasize the high spatial frequency component in the document image data is conducted. This supports the operation to remove the blur on the image. The document image data which is subjected by the spatial filtering processing is outputted next to a primary scanning enlargement·reduction processing circuit J3. Herein, in order to realize a copying accompanied by the enlargement·reduction rate which is specified for the use of the apparatus by, for example, an input section H which will be described later, the interpolation processing (enlargement) or thinning processing (reduction) is conducted on the document image data.

The data outputted from the enlargement·reduction processing circuit J3 is outputted to a gamma curve processing circuit J4. This gamma curve processing circuit J4 is a circuit which sets, according to the information relating to the document density previously collected by a EE (Electric Eye) scan, an appropriate gamma curve, for example, relating to the document S which is written by a pencil, so that the characters are copied darker on the transfer sheet, and conducts the density conversion processing according to this. Further, in the gamma curve processing circuit J4 in the present embodiment, particularly in the outside of the document erasure function, in order not to conduct the image formation on a portion which is recognized as the outside document area NSR, the gamma curve is set so that the output relating to the portion becomes "0".

In this manner, the document image data which is subjected to the density conversion processing is outputted to a error diffusion processing circuit J5, for example, when the document image data is one according to the photograph (=document S) and is halftone, at the time of the image formation, the document image data is processed so that a smooth gradation expression is realized.

The document image data in which the processing as above is conducted, is outputted to the image memory JM and stored in it. In this connection, in this image memory JM, the document image data is controlled in such a manner that the page of the read-in document (in the case of the double side reading, the double sides) is regarded as a unit. That is, the file number is given for each page and according to this, read and write operations are conducted.

The document image data stored in the image memory JM is outputted next to the PWM correction processing circuit J6.

In this manner, the document image data which is subjected to each processing, is finally outputted to the image writing section 20 through the image output circuit J7. Hereinafter, according to the document image data, the oscillation mode of the above semiconductor laser is controlled and the electrostatic latent image is formed on the photoreceptor drum 31, and subsequently, the publicly known processing is advanced.

In this connection, for the image processing section J, other than the above, the nonvolatile memory JVN or the read only memory JR is arranged. The former nonvolatile memory JVN is used in the case where, for example, it is wanted that each kind of setting condition, that is, its setting content is stored and maintained also after the power source OFF, however, depending on the case, it is wanted that its content is changed, and latter read only memory JR stores the information such as each kind of message displayed on the LCD touch panel 90 which will be described later, and other indispensable information for the system working.

Further, for the data bus B, as shown in FIG. 4, the input section H is connected. As the specific structure of the input section H, for example, the well known LCD touch panel 90 may be adopted. The user of the apparatus presses and indicates each kind of icon or button shown on this LCD touch panel 90 by the finger, and the change of the copy density or magnification, and the output setting of the transfer sheet P can be conducted.

In this connection, in the case where such the LCD touch panel 90 is used, the input section H is used also as the display means for transmitting the setting condition of the apparatus to the operator. Further, the specific arrangement example of the input section H described herein, or the LCD touch panel 90 to the copier 1, is shown in FIG. 2. In this connection, in FIG. 2, further, for example, it is made a numerical key mode, or the hard key 90H which is specified to the content frequently indicated such as the copy execution is shown, and it is needless to say that such the mode is also included in the input section H.

The operation and effect of the copier 1 which is the structural example, will be described below. In this connection, the operation and effect which will be described below will be described taking notice of the outside document erasure function, specifically, its document background level value or the erasure method of the outside document area in the function.

Figure 7:
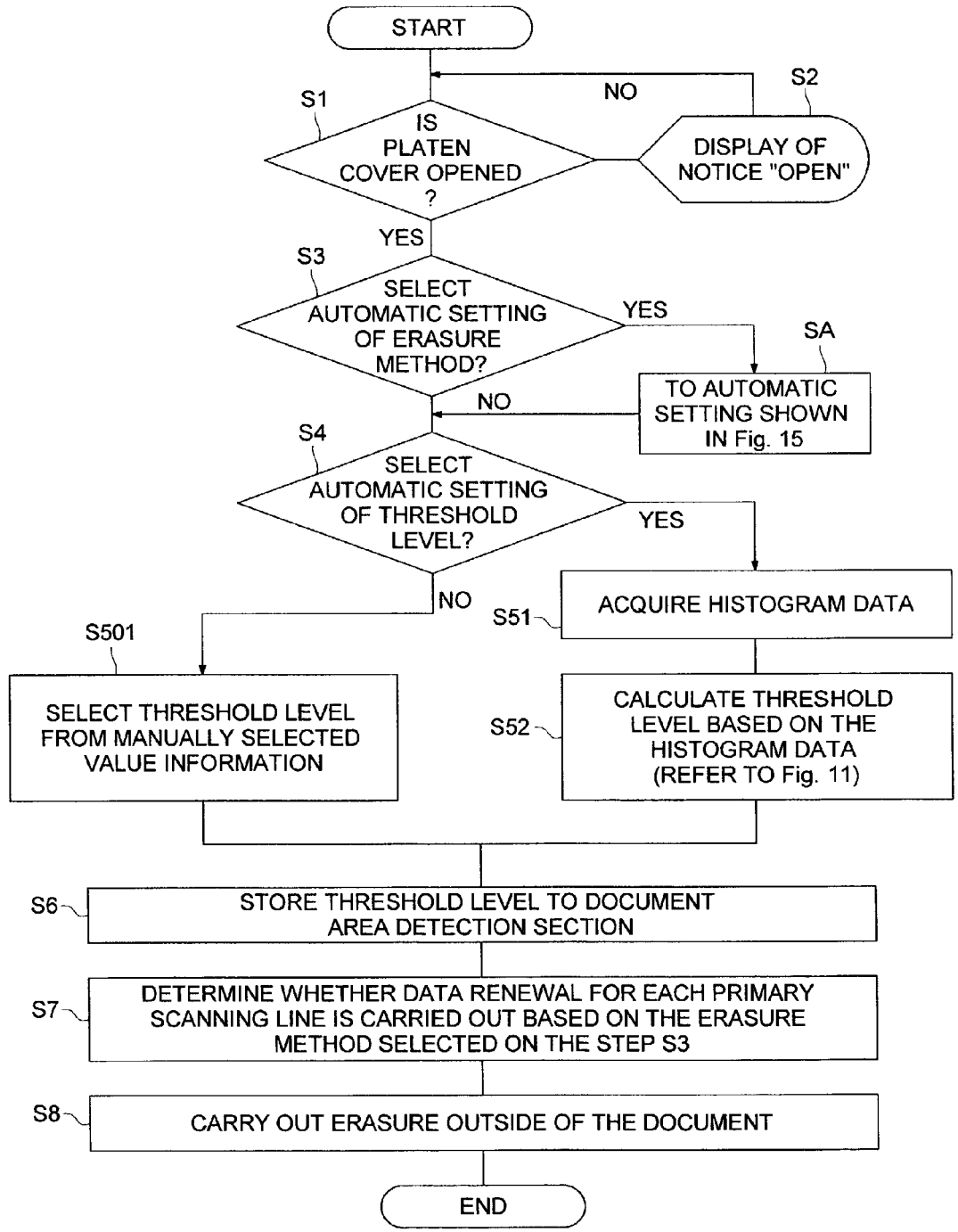
FIG. 7 is a flow chart showing a condition of a flow of the processing of an outside of the document erasure function including a threshold level setting processing.

Initially, the apparatus user places the document S on the platen glass 11 shown in FIG. 1 or FIG. 2 and selects the execution of the outside of the document erasure function. Then, the present copier 1, as shown in the step S1 of FIG. 7, is confirmed whether the platen cover 11C covers the platen glass 11 surface, that is, the open and close condition of the cover 11C is confirmed according to the output of the cover detection sensor OSS. Herein, when the cover 11C is closed, on the LCD touch panel 90, for example, a message such as "open the cover" is displayed and an appropriate processing is urged to the apparatus user (step S2 of FIG. 7). On the one hand, when the platen cover is opened, the sequence advances to the next processing.

In this manner, a processing that the platen cover is made the opened condition, is for the reason that the sky shot described in the term of the prior art is realized. The meaning that such the processing is conducted, will be clear at the time of the explanation of step SA1 of the later FIG. 15.

Then, next, the present copier 1 makes the apparatus user select either one of the automatic setting or manual setting for the outside of the document erasure method as shown in step S3 of FIG. 7. Herein, when the automatic setting is selected, the sequence advances to the automatic setting routine SA, and when the "manual setting" is selected, the sequence advances to the next processing.

In the present embodiment, as the outside of the document erasure method, either one of the rectangle erasure or the oblique angle erasure can be selected. Then, the automatic setting means that, according to the histogram which will be described later, the more adequate method is automatically selected and set from the two erasure methods, and the manual setting means that the apparatus user arbitrarily selects and sets one of the two erasure methods.

Figure 8:
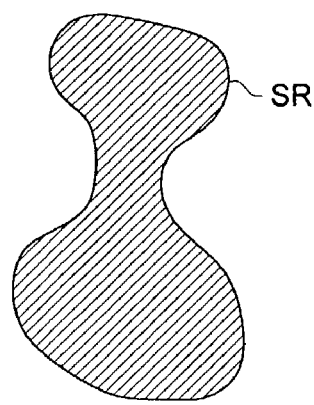
FIGS. 8(a)–8(c) are views for explaining an erasure method in the outside of the document erasure function, and respectively.
Figure 8:
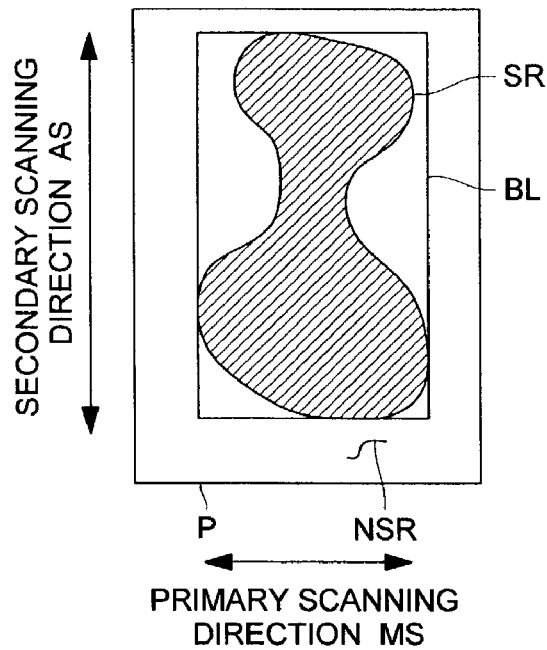
Figure 8:
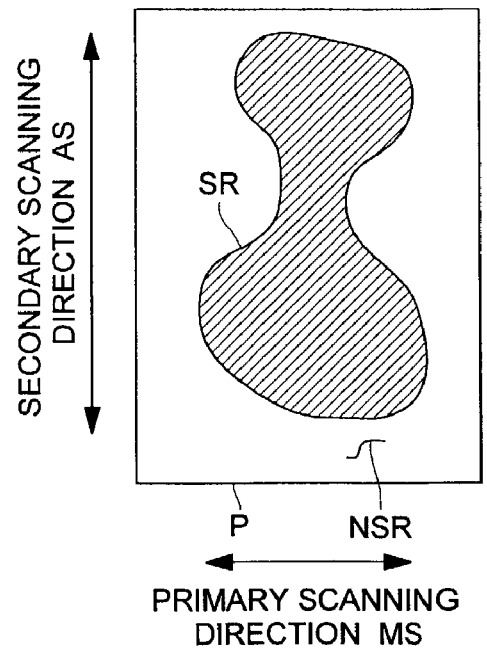

Herein, the rectangle erasure means a erasure method in which, for example, as shown in FIG. 8(*a*), for the document SI whose shape is irregular, the area inside the minimum quadrangle including the document SI is recognized as the document area SR, and the area except that, is recognized as the outside document area NSR (rectangle erasure function). Accordingly, when this is image formed on the transfer sheet P, as shown in FIG. 8(*b*), a position BL which is outputted in the void area exists.

On the one hand, the oblique angle erasure is a erasure method in which, in the same manner for the document SI shown in FIG. 8(*a*), the shape of the document SI itself is recognized as the document area SR, and the area except that, is recognized as the outside document area NSR (oblique angle erasure function). Accordingly, when this is image formed on the transfer sheet P, as shown in FIG. 8(*c*), a position which is outputted in the void area corresponding to BL does not exist.

In this connection, the recognition method of the document area SR when these rectangle erasure or oblique angle erasure is conducted, will be described at the time of explanation of the later step S8. Further, the selection according to the above automatic setting or manual setting, or the rectangle erasure or oblique angle erasure can, for example, as shown in FIG. 9, be structured in such a manner that a symbol 91 expressing the rectangle erasure and a symbol 92 expressing the oblique angle erasure and the automatic setting button 93 are displayed on the LCD touch panel 90, and by pressing any one of them, it is conducted.

Figure 9:
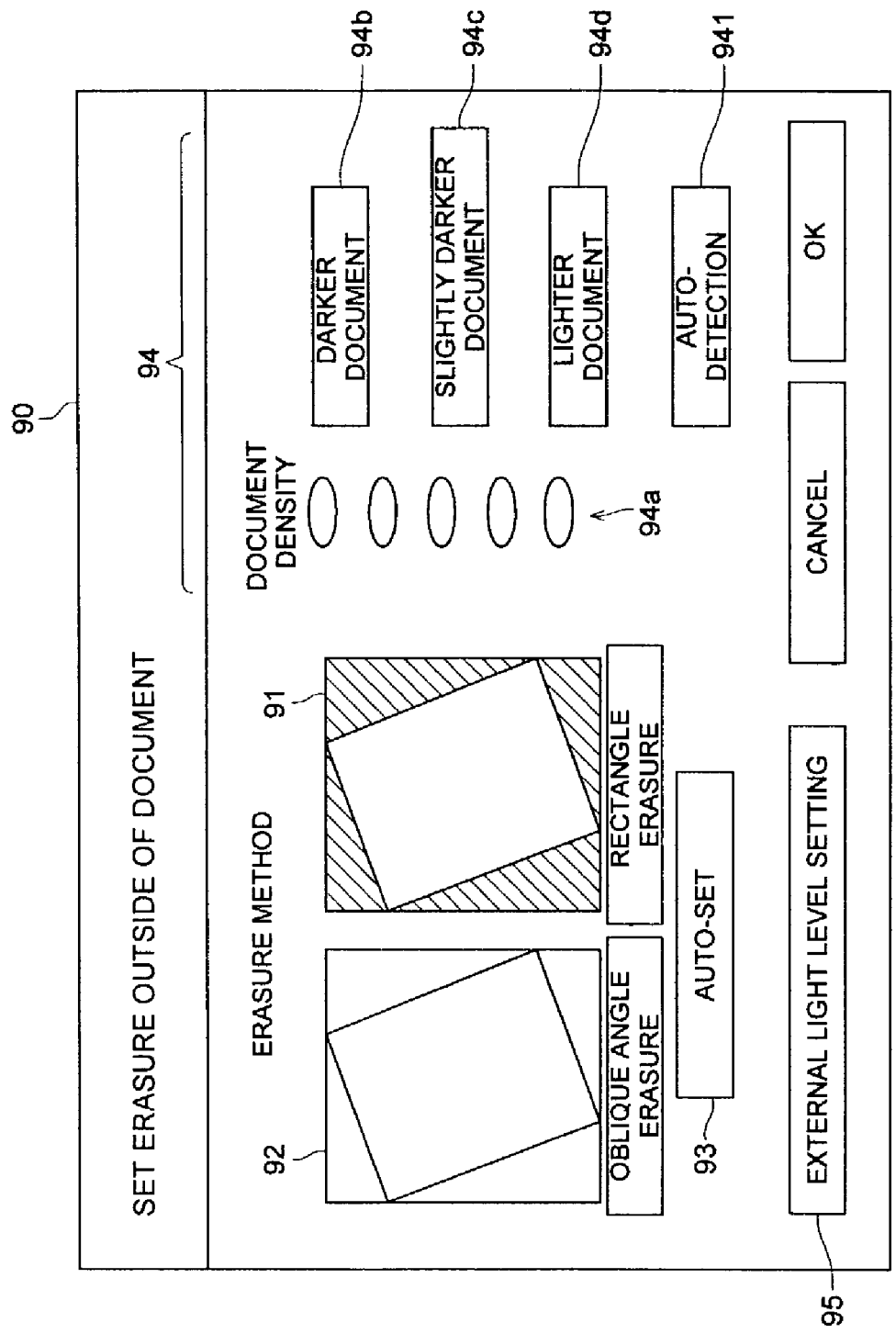
FIG. 9 is an illustration showing an display example of a setting image plane relating to the outside of the document erasure function.
Figure 15:
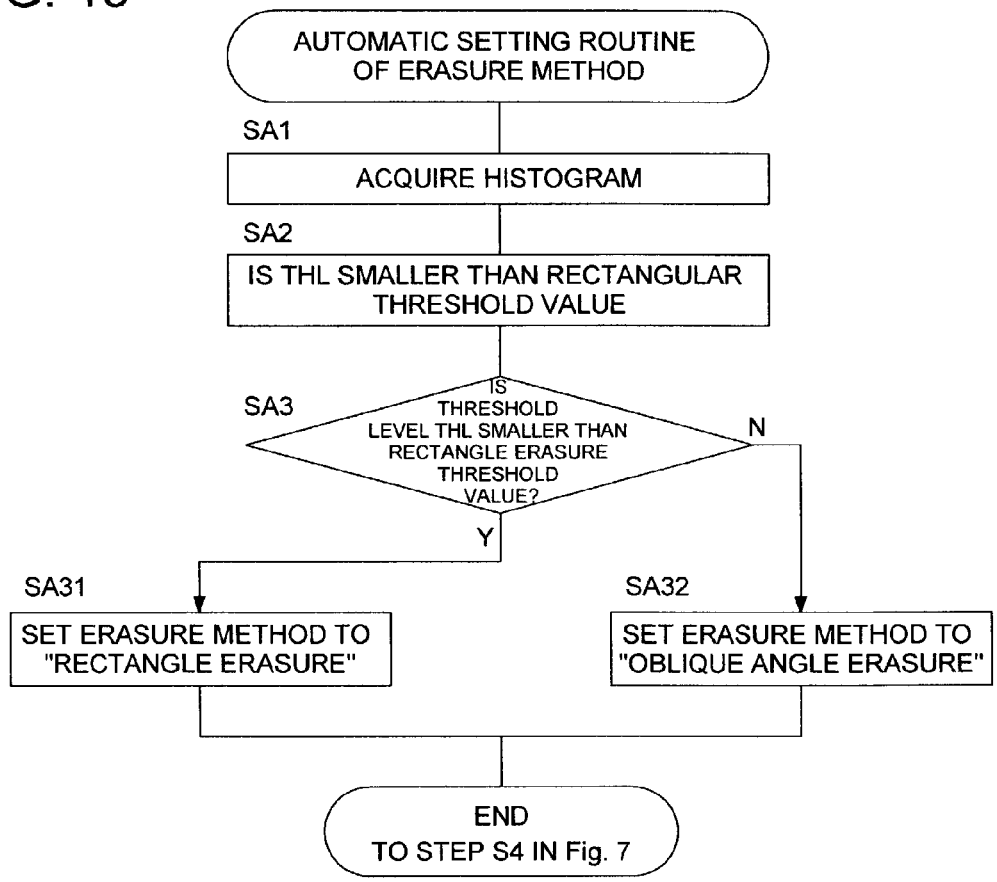
FIG. 15 is a flow chart indicating a state of processing flow of an automatic setting routine of erasure method.

When the automatic setting button 93 in FIG. 9 is pressed by the apparatus user, and the automatic setting is selected, the sequence advances to the erasure method automatic setting routine SA. In details, this is a flow chart as shown in FIG. 15.

Initially, herein, the calculation of the threshold level THL (document background level value) for automatically setting the erasure method will be described. On the one hand, because this threshold level THL can be used also for the threshold level THL (area recognition threshold level value) for recognizing the SR and NSR of the document S, from both sides of the side of the automatic setting and the side of the recognition of SR and NSR of the document, the threshold level THL will be described.

As there is in the step SA1 of FIG. 15 which will be described from now, the histogram data is acquired. This histogram data, when speaking in FIG. 5, is made in such a manner that the output signal of the image reading section 10, that is, onto the document S on the platen glass 11, the light of the light source 12 is projected, and the reflected light is acquired (scanning which is an object to obtain the histogram data, hereinafter called "HD scan") for each primary scanning line (and each pixel), and the luminance data value which is an electric signal into which this is converted by the CCD image pick-up apparatus 17, is outputted to the histogram making circuit JH and it is made according to the luminance data value.

Figure 10:
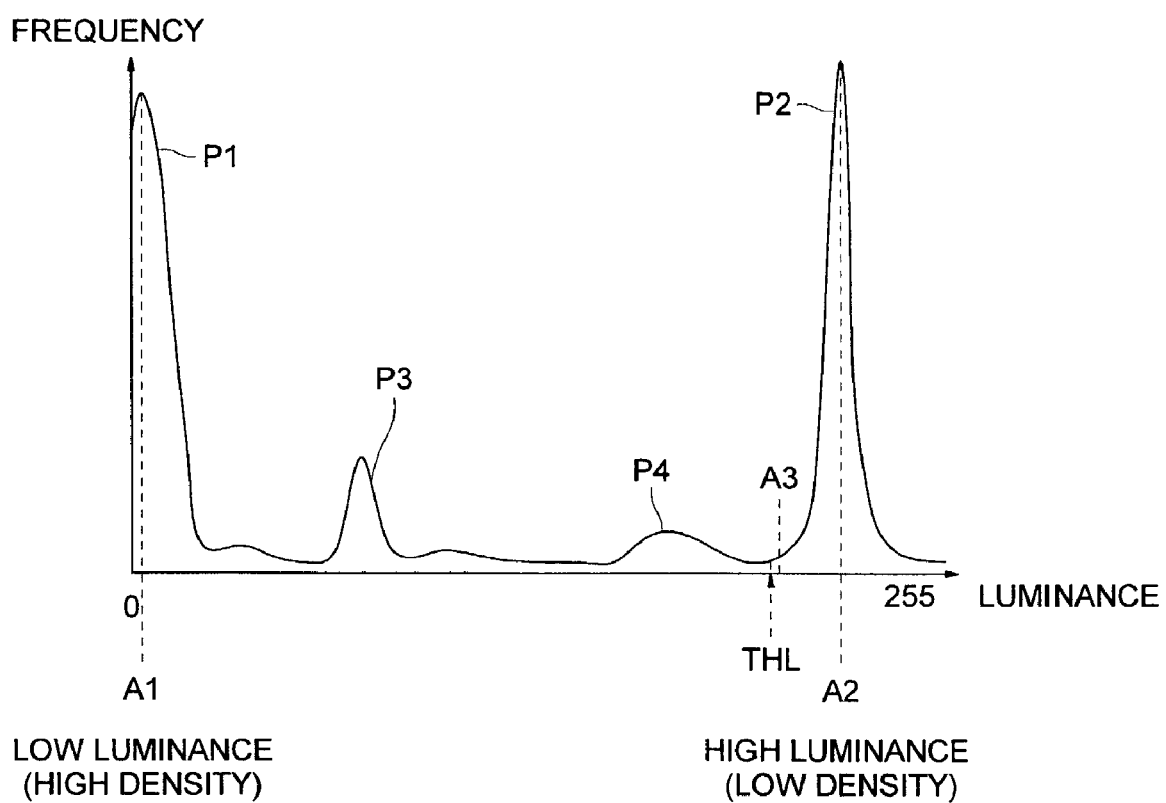
FIG. 10 is a graph showing a histogram data example acquired when the document background is lighter.

The histogram data acquired in this manner, is the data shown in, for example, FIG. 10, and a graph in which the luminance value is taken in the horizontal axis, and the result in which the luminance data value is totaled in the corresponding point (each luminance value) in the horizontal axis is taken in the vertical axis.

Herein, as for the peak P1 seen left in FIG. 10, it is expressed that the density is very low, that is, the luminance data value in which the reflected light of the light of the light source 12 is scarcely acquired, is frequently acquired. That is, the peak P1 is assumed that it is a totaled result of the luminance data value acquired according to the sky shot. It is because the sky shot means that the light of the light source 12 is projected to an area in which nothing by which the light of the light source 12 is reflected exists, and therefore, the reflected light intensity is equal to almost 0.

Further, inversely to the peak P1, as for the peak P2 seen right in FIG. 10, it is expressed that the luminance is very high, that is, the reflected light whose intensity is large in the reflected lights is frequently detected. This assumes that the "background" of the read document S is "white". It is because it can be generally assumed that the area of the background area of the document S is larger than the image area formed on the document S (the frequency value is large), and further, the fact that the reflected light intensity is large is a powerful evidence that the color of the reflection surface is white. In this connection, the peak P3 and the peak P4 in FIG. 10 are corresponding to the reflected light by the image (for example, characters) formed on the document S.

Accordingly, it can be considered that the peak P1 generally expresses the existence of the outside document area NSR, and the peak P2 generally expresses the existence of the document area SR (specifically, its outer periphery). Then, from such a matter, when, between the peak P1 and peak P2, the threshold level which will be described below, is set, the adequate separation of each area SR and NSR, or the adequate distinction is possible. In this connection, the meaning that the platen cover is made the opened condition as described above, is seen herein. It is because the fact that sky shot is realized and the peak P1 is made to exist, means that the "index" which can surely conduct the adequate distinction can be acquired.

In this connection, the histogram data in FIG. 10 is the example in which the luminance value is taken in the horizontal axis, that is, the luminance histogram, is shown as an example, and in the present invention, in replace of this, it may be allowable that the density histogram in which the density value is taken in the horizontal axis is acquired. This is for the reason that the relationship between the luminance and the density is a monistic relationship as described above by referring to FIG. 6, and even when either one is considered as the reference, there is no influence on the operation and effect according to the present invention. However, because the data directly acquired in the image reading section 10 is the data according to the luminance (luminance data value), from the point of the histogram making speed, it can be said that the making of the histogram is somewhat preferable. However, such a thing is only a problem of the degree.

As described above, when the histogram data is acquired, next, as in the step SA2 in FIG. 15, the threshold level THL is automatically calculated according to the histogram data. Speaking in FIG. 5, in the histogram making circuit JH, the calculation operation is also conducted. Herein, the threshold level THL, as sometimes described above, is used as the reference value to select any one of the reference value when the document area SR for the document S and the outside document area NSR are distinguished, the rectangle erasure and the oblique angle erasure.

In this connection, in the above description, it is described that, in the histogram making circuit JH, the calculation processing of the threshold level THL is conducted, but the present invention is not limited to this, and the calculation operation is may be conducted by the control section C, or it may also be conducted by the exclusive hardware (=Gate Array).

Figure 11:
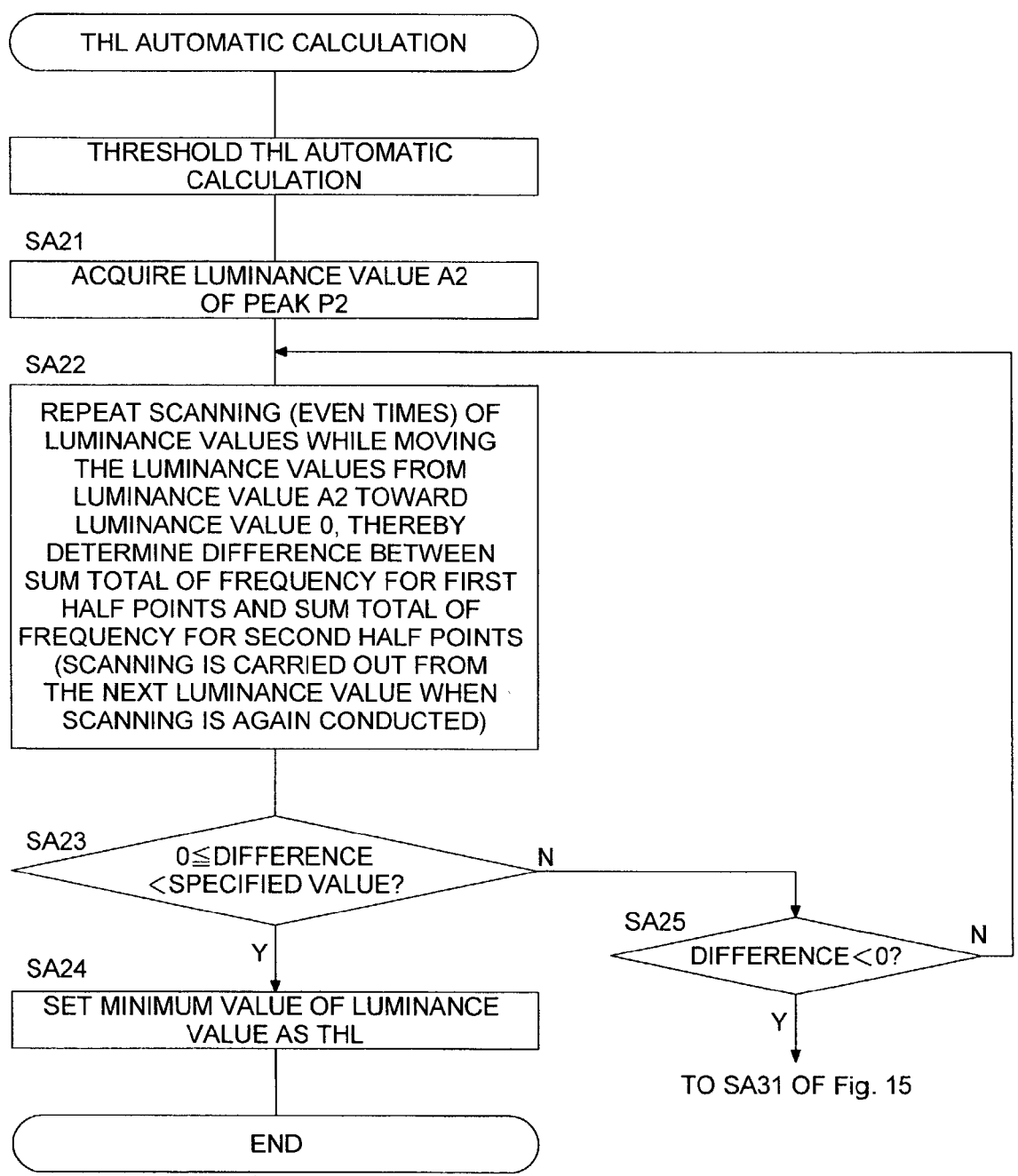
FIG. 11 is a flow chart showing a flow of a threshold level automatic calculation processing.

This threshold level automatic calculation is conducted as the flow chart shown, for example, in FIG. 11. Initially, as in the step SA21 in FIG. 11, in the acquired histogram, the luminance value A2 in the peak whose frequency value is the first place other than the peak P1 which is acquired according to the sky shot, is acquired. As the luminance value, for example, the central value of the peak may be used.

Next, in the step SA22 and SA23 in FIG. 11, the threshold level THL is calculated. As the representative method, there is a calculation method in which the addition mean of A1 and A2 in FIG. 10 is made the threshold level THL, however, herein, the calculation method when the "start point" of the curve forming the peak is made the threshold level THL will be described below.

Initially, it is repeated even times that the luminance value is moved from the luminance value A2 to the luminance value 0 direction and the luminance value is scanned, and the difference (difference value of frequency) between the total sum of the frequency of the initial half points and the total sum of the frequency of the latter half points is acquired. Next, when the difference is not higher than the specified difference value, any one of the scanned luminance value is made the threshold level THL, and when the difference is not lower than the specified difference value, the difference is acquired by further repeating the scanning from the final point of the scan, and the comparison to the specified difference value is repeated and the threshold level THL is acquired. The acquired threshold level THL is shown in FIG. 10. As for the step SA25 in FIG. 11, it will be described later.

In this connection, the specified difference value compared to the above difference is stored in, for example, the non-volatile memory JNV or the read only memory JR.

The calculation of this threshold level THL is for calculating a portion in which the "inclination" of the curve forming the peak at the luminance value A2 as shown in FIG. 10 is very small, in other words, the "start portion" of the curve forming the peak or "the foot". Accordingly, the calculation method is not limited to only the above method. Further, the movement of the scan shown in the calculation procedure may be the movement of each one scan or the movement of several scans, and the number of times of the scan is also allowable when it is more than 2 times so as to conduct the difference, and even when it is even numbers, any measure may be applied when the total sum is acquired. According to the scan method or the method of obtaining the difference, it may be considered that the specified difference value is varied.

Further, in FIG. 11, the minimum one of the luminance value at that time is made the threshold level THL, however, it may be any one of the luminance value of the frequency at which the difference at that time is acquired, or various values such as the mean value are considered. Further, herein, the difference which begins to move from the peak toward the foot is acquired, however, it is also possible that the difference which begins to move from the foot side toward the peak is acquired and when it is more than a regulation value, the threshold level THL is acquired.

In the luminance histogram in FIG. 10, as described above, the peak P1 whose luminance is very low, and the peak P2 whose luminance is comparatively high exist. Then, because these peak P1 and the peak P2 respectively, as also described above, can be assumed as the peak according to the sky shot, that is, as one expressing the outside document area NSR and the peak according to the white background area of the document S, that is, as one expressing the document area SR, the luminance value A2 expressing the document area SR is acquired. Further, by the calculation according to the steps SA22 and SA23 in FIG. 11, the highly reliable threshold level THL by which the area SR is surely recognized, can be acquired (refer to FIG. 10).

Figure 12:
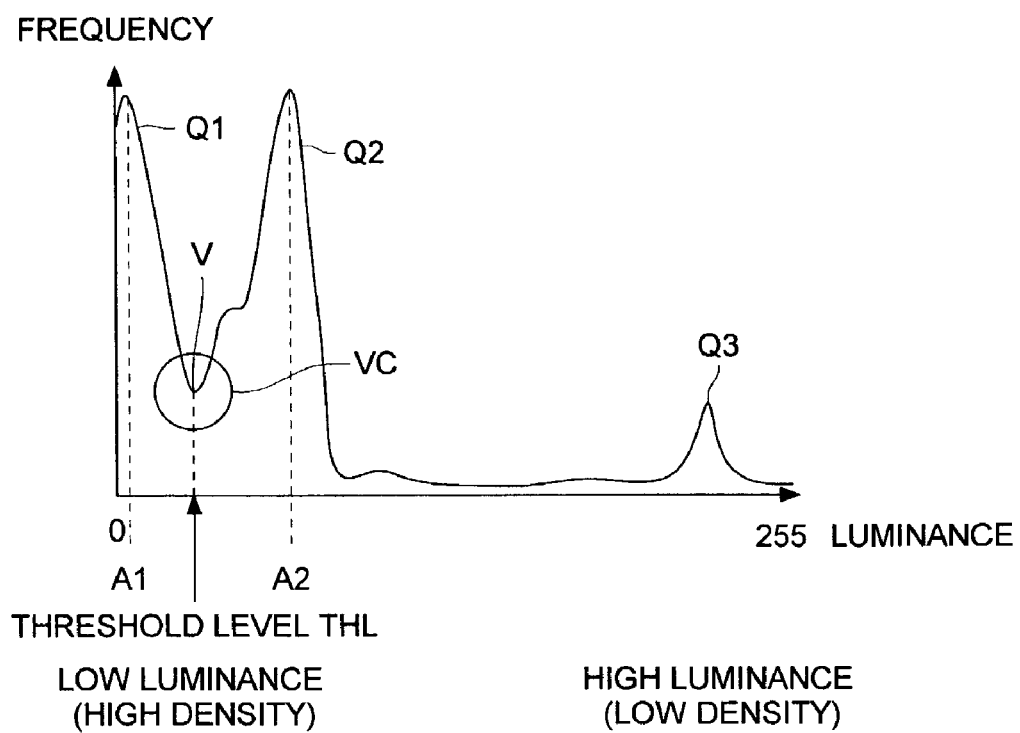
FIGS. 12(a) and 12(b) are graphs showing the histogram data example acquired when the document background is darker.
Figure 12:
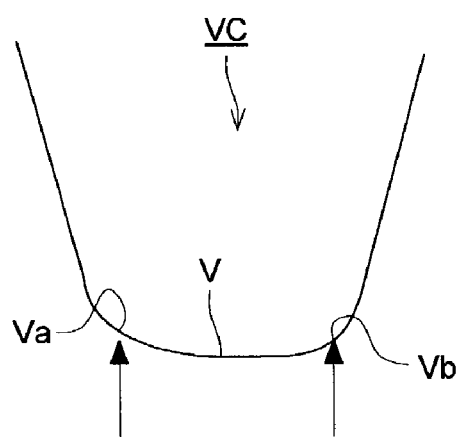

On the one hand, as the histogram data, there is a case where the data other than that in FIG. 10, for example, the data as shown in FIG. 12 is acquired. In this FIG. 12, in the leftmost portion, the peak Q1 which is assumed as the luminance data total result according to the same sky shot as shown in FIG. 10 is seen, but, it can be seen that, as the different point from that in FIG. 10, the peak P2 which is seen right in FIG. 10 does not exist, and further, in a direct right portion of the peak Q1, the peak Q2 exists.

This peak Q2, as clearly be seen from FIG. 12, the luminance value is low (that is, the density is high). Further, from the same reason as the assumption that the peak P2 in FIG. 10 is the "background" of the document S from "it appears as a peak (the frequency value is large)", it is assumed that the peak Q2 also expresses the background of the document S. After all, the histogram as in FIG. 12 expresses that the background of the read document S is, for example, "darker document" such as black or darker green. In this connection, the peak Q3 of the right portion in FIG. 12 is according to the image composed of, for example, a hollow character formed on the darker document S.

Even in such a case, basically, it is possible that the processing according to the flow chart shown in FIG. 11 is conducted. That is, on the basis of the difference value acquired by scanning from the difference value A2 relating to the peak Q2, it can be acquired as the threshold level THL.

However, in the case as shown in FIG. 12, as compared to an example shown in FIG. 10, as both peaks Q1 and Q2 are closer to each other, because both curves are superimposed, it becomes difficult that a portion in which the "inclination" of both curves is very small, appears. As the result, before the difference is lower than the specified difference value, it reaches the curve forming Q1, and a negative value, that is, the inverse inclination is shown, and it is considered that a case where the threshold level THL can not be calculated is generated. In this case, the "valley (under peak)" may be made the threshold level THL (refer to FIG. 12). For example, the central value of the valley (under peak) may be taken. That is, even when the histogram data shows the mode as shown in FIG. 12, the setting of the more adequate threshold level is possible.

In this case, although the purpose of use is described in the top of the explanation of this threshold level THL, when it is the threshold level THL for the recognition of the SR and NSR of the document S, it is necessary to determine any value as described above, however, when it is for only automatic setting of erasure method, specifically it is unnecessary to determine herein (step A25). The reason will be described in the stage of erasure method automatic setting shown later.

Figure 13:
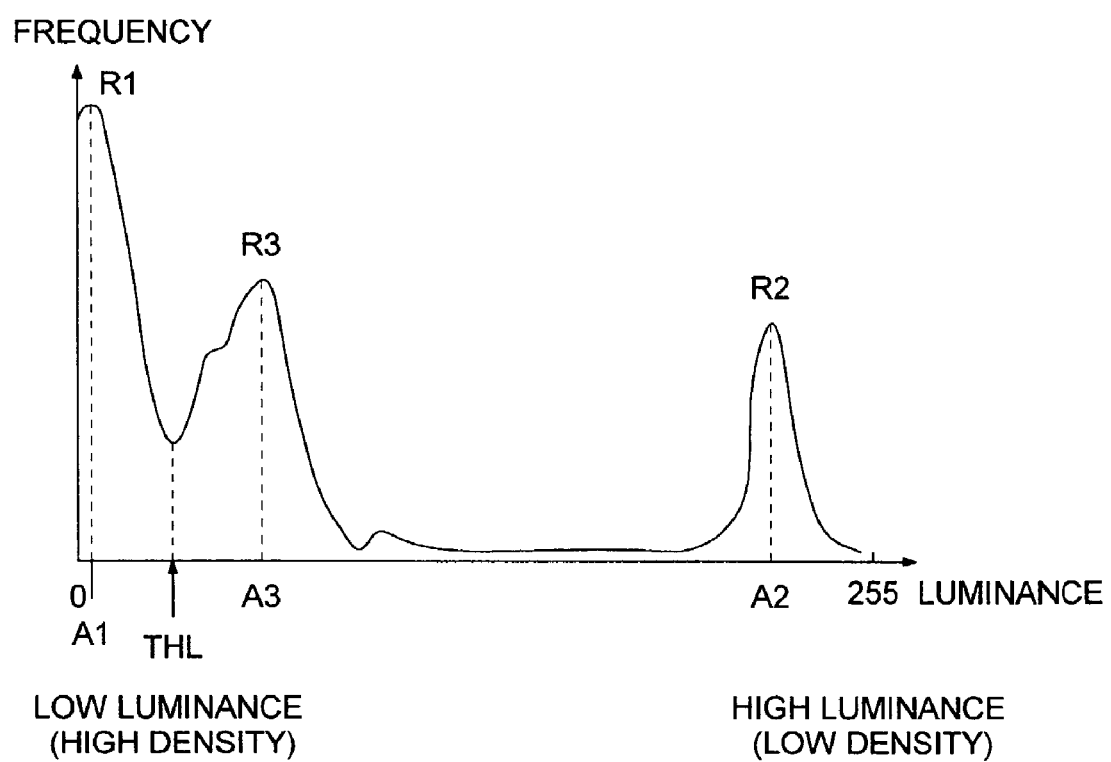
FIG. 13 is a graph showing the histogram data example when the document background is mixed with a darker and lighter colors.

Further, as the histogram data, there is a case where, for example, the data as shown in FIG. 13 is acquired. In this FIG. 13, although the peak R1 assumed as the luminance data value totaled result according to the same sky shot as shown in FIG. 10, is seen in the most left portion, as the different point from FIG. 10 and FIG. 12, it can be seen that R2 in the same manner as the peak P2 seen right in FIG. 10, further, the peak R3 in the direct right portion of the peak R1 exist.

This peak R2 has, as clearly seen from FIG. 13, the high luminance value (that is, the density is low), and the peak R3, as clearly seen from FIG. 13, has the low luminance value (that is, the density is high). Further, in the same reason that, because both "appear as the peak (the frequency value is large)", the peak P2 in FIG. 10, and FIG. 12 are assumed as the "background" of the document S, it is assumed that the peaks R2 and R3 also express the background of the document S. It is expressed that the density of the pretty portions of the document S whose density is low, is high. That is, for example, it is assumed that the "framing" is conducted on the document.

In such the case, it is preferable that the processing according to the flow chart shown in FIG. 11 is conducted by using R3. It is because, in the case of the "framing", when the threshold level THL is calculated by using R2, the framing is recognized as NSR.

Further speaking, in this case, basically, the same processing as described by using FIG. 12 may be conducted. Thereby, also in the case where the mode as in FIG. 13 is shown, the more adequate setting of the threshold level THL can be conducted.

Further, the recognition of this R3 is compared to the ratio of the frequency of R2 or the area rate for which the curved portion forming the peak forms, and it may be allowed that, when it is more than a predetermined value, R3 is recognized.

In this connection, in the present invention, as a base for calculating the threshold level THL, other than the foot or valley (under peak), various character points in which the histogram data shows, can be used. For example, it can be considered that the "inflection point" or "peak" is used, and the threshold level THL is acquired. For example, it can also be considered that the "maximum point" or "minimum point" on the histogram data curve shown in FIG. 10 or FIG. 12 is used. In this connection, it is natural that the method by which the characteristic point other than such a peak is used and the threshold level THL is acquired, can be applied in the case as shown in FIG. 10.

In the present invention, further widely, it is not limited to a mode in which the histogram data is made and from its characteristic points, the threshold level THL is set, but, a mode in which any characteristic grasped from the output of the image reading section 10 is used, and the threshold level THL is automatically set, is included. For example, as such a characteristic, the method by which the difference of the image data is detected, considered. That is, the image data is successively scanned, and the method by which the intermediate luminance value of the luminance value of the portion (the background of the document) in which the luminance value is largely changed from the low luminance value which is considered as the outside document area NSR is made the threshold level THL, can be considered. In this connection, from this point of view, it can be said that the histogram data corresponds to the characteristic herein.

Now, the erasure method automatic setting will be described below.

Next, as shown in the step SA3 in FIG. 15, it is judged whether the acquired threshold level THL is smaller than a predetermined "rectangle erasure threshold value". Herein, when the threshold level THL is smaller than the rectangle erasure threshold value, the erasure method is set to the rectangle erasure (step SA31 in FIG. 15), and when it is larger than that, it is set to the oblique angle erasure (step SA32 in FIG. 15). Further, before the difference is lower than the specified difference value, when the negative value, that is, the inverse inclination is shown, and the threshold level THL can not be calculated, the erasure method is set to the rectangle erasure (step A25 in FIG. 11). When the processing heretofore is completed, the sequence returns to the step S4 in FIG. 7, as shown in FIG. 15, FIG. 11 and FIG. 7.

In this connection, the rectangle erasure threshold value is stored in, for example, the non-volatile memory JNV shown in FIG. 5 or read only memory JR.

Further, the rectangle threshold value has the close relationship with the threshold level THL, and the background density of the document S in which a portion lacking of the image is not generated, is empirically found and acquired. Accordingly, in the stage of explanation of the threshold level THL calculation, many kinds of threshold level THL calculation methods are described, however, the rectangle erasure threshold value has the optimum value for each threshold level THL calculation method.

The processing as described above is according to the following background. That is, when the read document S is "lighter document", that is, when the threshold level THL is high, because the histogram as shown in FIG. 10 ought to be acquired, the peak according to the sky shot and the peak according to the background of the document S appear in portions which are largely separated in the luminance value. Accordingly, the document area SR and the outside document area NSR can also be surely distinguished. Because this means that, that is, the distinction of the document area SR for each primary scanning line and the outside document area NSR is surely conducted, as the erasure method, even when the oblique angle erasure is selected, this can be accurately realized. Further, in spite of the case where the density of the background of the document S is lighter, the image does not become the image with a bad appearance in which the black solid output exists.

On the one hand, when it is judged that the document S is "darker document", that is, the threshold level THL is low, or when, before the difference is lower then the specified difference value, the negative value, that is, the inverse inclination is shown, and the threshold level THL can not be calculated, because the histogram data as shown in FIG. 12 must be acquired, the peak according to the sky shot and the peak according to the background of the document S appear at the portions which are not so far separated in the luminance value. Accordingly, the selection and setting of the threshold level THL are comparatively difficult, and as a result, in the distinction of the document area SR and the outside document area NSR, a predetermined uncertainty is accompanied.

This means, that is, that, because as for the distinction of the document area SR and the outside document area NSR for each primary scanning line, a predetermined uncertainty is accompanied, and when the oblique angle erasure is selected, the failure in which a portion of the image is lacked, is easily generated, as the erasure method, unconditionally, it is more safe that the rectangle erasure is selected. Because, in this manner, as for the minimum quadrangle surrounding the document S, because at least the image formation is conducted, the possibility that the content of the document S is not copied on the transfer sheet P, can avoided.

As described above, according to the execution of the present processing, because the adequate erasure method is automatically selected, it is not necessary that the apparatus user conducts the manual erasure method setting. Further, particularly, according to such the processing, it can also be listed as the effect that the apparatus user need not to pay special attention to the placement condition on the platen glass 11 of the document S. That is, for the platen glass and the placement of the document S, generally, it is preferable that the sides of both coincide with each other, however, depending on the case, it is also not few that the document S is placed with some displacement. According to the above processing, in this case also, the fine output image can be acquired.

Well, returning to FIG. 7, next, when the manual setting of the outside of the document erasure method in step S3 in FIG. 7 is selected, it is selected and set that, whether the threshold level for the SR and NSR recognition of the document S is made the automatic setting or manual setting, or when the manual setting is selected, to what value the threshold level is made.

Initially, the automatic detection button 941 in FIG. 9 is pressed by the apparatus user, and when the threshold level automatic setting is selected, the sequence advances to the step S51 and S52, and it may be calculated by any one method of the calculation method of various threshold levels THL described heretofore. Further, even the case of the automatic setting of the erasure method, it may be the same as the threshold level THL for the erasure method automatic setting, or it may be calculated again by other methods. Further, in the case where it is the same calculation method, as shown in the step A25 in FIG. 11, when the threshold level THL for the erasure method automatic setting is not determined, it is natural to be determined by other methods.

When it is the manual setting, the sequence advances to the step S501 in FIG. 7, and the apparatus user selects basically arbitrary threshold level THL. That is, the apparatus user uses 5 stage button 94a shown in a document density setting area 94, and may select and set any one of 5 kinds of threshold levels THL which is predetermined according to the background density.

Further, in FIG. 9, in addition to the above description, the setting of the threshold level THL is conducted in such a manner that, by pressing and selecting a darker document button 94b, a slightly darker document button 94c, and lighter document button 94d, the user can also select and set any one of above 5 kinds of threshold levels THL. Herein, the darker document means, for example, a document in which the background of the document S is black, the lighter document means, for example, a document whose background is white or near white, and a slightly darker document means a document whose background is middle tone between them.

As described above, when the outside of the document erasure method and the threshold level THL for the SR, and NSR recognition of the document S are determined by the automatic setting or manual setting, as shown in the step S6 in FIG. 7, the threshold level THL is stored in a threshold level memory in an image area detection section JJ shown in FIG. 5.

Next, as shown in the step S7 in FIG. 7, according to the erasure method selected in the step S3 in FIG. 7, it is determined whether the data renewal is conducted for each primary scanning line of the document S, and subsequent to this, as shown in the S8 in FIG. 7, according to the result of the determination and the above threshold level THL, the sequence enters into the recognition operation of the document area SR.

In this connection, the subsequent processing is conducted, as generally explained, for example, in the item of the prior art, and further, as disclosed in Japanese Tokkaihei No. 7-307856 (definite form erasure, i.e., rectangle erasure) described in that item, or Tokkaihei No. 7-111579 (indefinite form erasure, i.e., oblique angle erasure). That is, the recognition method of the document SR according to the present embodiment and the recognition method in the above official gazettes are basically the same. Accordingly, relating to the circuit structure for realizing the logical sum calculation which will be described below and the other logical operation, refer to the above official gazettes.

Initially in the following, as the erasure method, the case where the rectangle erasure is set (step S3 in FIG. 7), will be described. In this case, initially, in the step S7 in FIG. 7, it is set that the data renewal for each primary scanning line to the document image data according to the area information is not conducted (no data renewal).

The rectangle erasure is, as described already, the outside of the document erasure as shown in FIG. 8(b) is conducted. Accordingly, when the document area SR is recognized, the minimum quadrangle including the document SI as shown in FIG. 8(b), is found, and this may be recognized as the document area SR. In other words, relating to the document SI, it may be allowed that a line (primary scanning line) having the longest distance in the primary scanning direction MS and a line (secondary scanning line) having the longest distance in the secondary scanning direction AS are found.

In order to conduct such the processing, as described in the item of the prior art, relating to the luminance data value about each primary scanning line (initially, the first line, and each pixel on the line) acquired initially by the pre-scan (the data acquired at the time of the HD scan may be used), the comparison calculation to the above-set threshold level THL is conducted in the comparator JJC shown in FIG. 5. Then, according to a fact that the luminance data value according to each pixel is higher or lower than the threshold level THL, it is made a binary coded data composed of the document background data value and non-document background data value. In this connection, because the threshold level value THL is adequately selected and set, this processing is conducted as the processing by which the error is hardly generated, and which is accurate.

The acquirement of this binary coded data is conducted successively from the first line to the final line, and for each data obtaining for each line, the logical sum for the before data is acquired. The binary coded data is successively renewed in the line memory not shown every time at which the logical sum is acquired (herein called "renewal" is different from "data renewal" in the step S7 in FIG. 7). Then, as the result of the repetition of such the renewal, in the finally acquired binary coded data, an area formed by the positions in which two document background data most separated in the primary scanning direction MS exist, is recognized by a document area recognizing section JJR shown in FIG. 5 as the document area SR.

Figure 14:
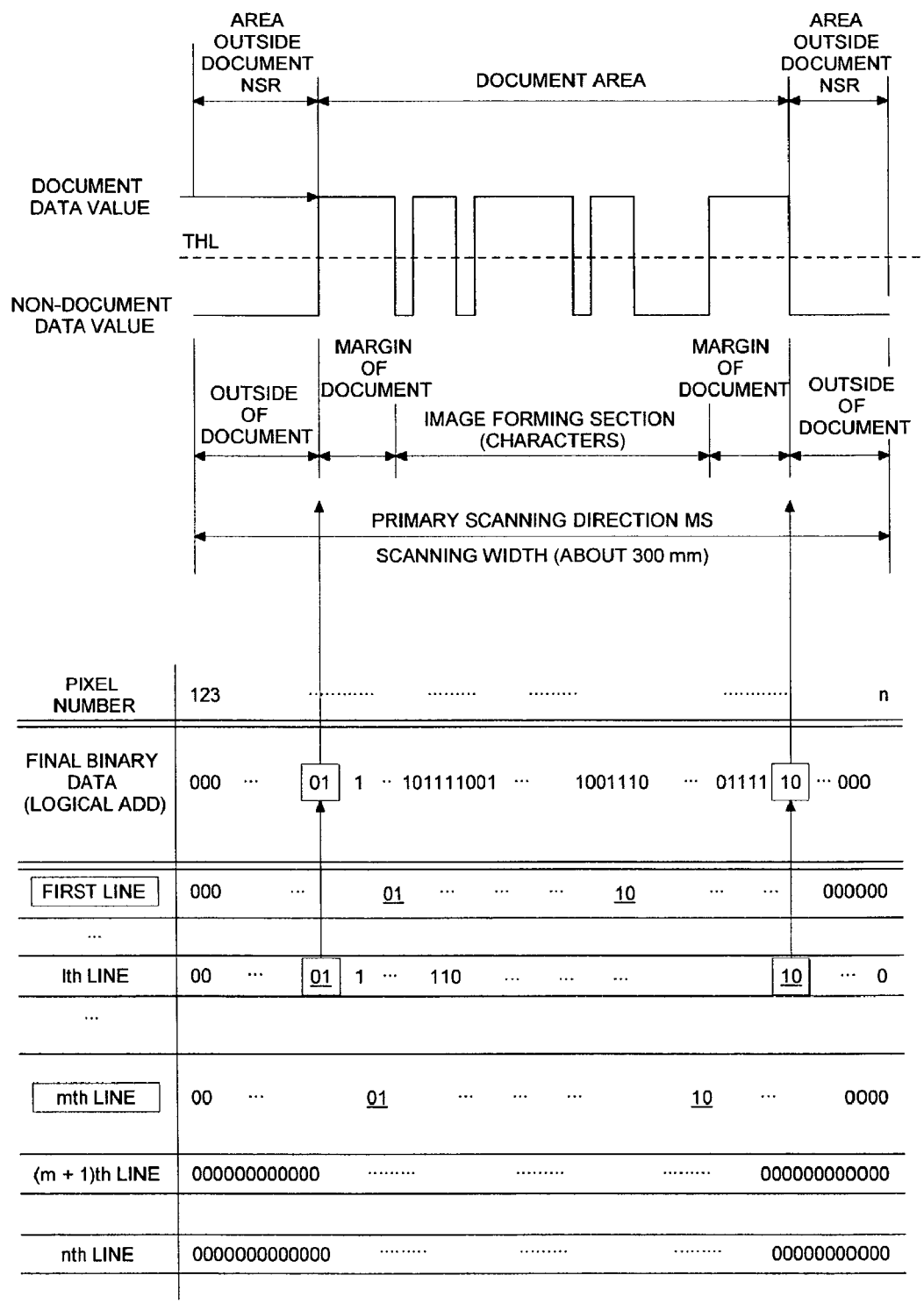
FIG. 14 is an illustration conceptually explaining the realization of the outside of the document erasure function using the rectangle erasure as the erasure method.

When this is conceptually illustrated, for example, it is a drawing as shown in FIG. 14, and in its upper portion, an example of the finally acquired binary coded data is typically shown. Further, in the lower portion in FIG. 14, an example of a series corresponding to this final binary coded data, and an example of a series of the binary coded data acquired for each primary scanning line until the data is acquired are shown. In this drawing, it can be easily recognized that the transition from 0 to 1, and the transition from 1 to 0 which are shown by the enclosed characters in the first line, perform the decisive role of the recognition of the document area S. In this connection, these two transitions are saved to the last by a fact that the final binary coded data is acquired by the logical sum as described above.

On the other hand, together with the recognition processing of the document SR relating to the above primary scanning direction MS, both end positions in the secondary scanning direction AS in which the foremost primary scanning line (in FIG. 14, the first line) in which it is recognized that the document background data value exists, and the last primary scanning line (in the same FIG. 14, the m-th line) position, are recognized in the document area recognizing section JJR, and an area sandwiched by the both end positions is recognized as the document area SR relating to the secondary scanning direction AS.

The above result is stored in an area storing memory JJM as the area information. Subsequent to this, this area information is sent to a gamma curve processing circuit J4, and in the gamma curve processing circuit J4, the gamma curve setting is conducted so that the outside document area NSR is not image formed (i.e., so that the toner is not transferred onto the transfer sheet P), for example, the gamma curve setting is conducted so that the output relating to the outside document area NSR is made "0". By the above description, the outside of the document erasure copy by the rectangle erasure method as shown in FIG. 8(b), is conducted.

On the one hand, in the oblique angle erasure, initially, in the step S7 in FIG. 7, it is set that the data renewal processing for each primary scanning line to the document image data according to the area information is conducted (data renewal exists).

Because the oblique angle erasure conducts the outside of the document erasure as shown in FIG. 8(c), when the document area SR is recognized, it is necessary that, for each primary scanning line in the document SI as shown in FIG. 8(b), the recognition result of the document area SR and the outside document area NSR is saved, and the processing of the document image data according to this is conducted.

In order to conduct such the processing, in the same manner as in the rectangle erasure, it is not changed that the binary coded data is acquired by the threshold level THL and comparator shown in FIG. 5. However, in the binary coded data acquired for each primary scanning line, the position in which the document background data value which is most separated in the primary scanning direction MS exist, (in FIG. 14, refer to the series position affixed with the under line), is stored in the area storing memory JJM respectively as area information. In this connection, the setting of the document area SR relating to the secondary scanning direction AS is the same as the case of the rectangle erasure.

Now, because it is the same as the case of the rectangle erasure that the binary coding processing in the above is conducted according to the adequate threshold level THL, in this case also, it is needless to say that the correct document area SR recognition is conducted.

After that, such the area information is sent to the gamma curve processing circuit J4, and in the gamma curve processing circuit J4, the gamma curve setting is conducted for each primary scanning line of the document image data so that the image formation for the outside document area NSR is not conducted, and in order that the output for the outside document area NSR may be made "0". The data renewal called in the step S7 in FIG. 7 means such a processing. By the above description, the outside of the document erasure copy by the oblique angle erasure method as shown in FIG. 8(c) is conducted.

In this connection, in such the outside of the document erasure by the oblique angle erasure, its effect is not only confirmed for the document SI whose shape is irregular as shown in FIG. 8 (a), but also in the case where, for example, the document S is placed askew on the platen glass 11, its effect is confirmed. That is, in such a case, when the rectangle erasure is selected, in the case where a portion which is black solid outputted as shown by the symbol 91 in FIG. 9, exists, when the oblique angle erasure is selected, it is because the image formation as shown by the symbol 92 in the same view is conducted.

However, when it is automatically set, there is no problem, however, when the outside of the document erasure method is manually set, there is a case where the background density of the document S and the selected threshold level THL or the outside of the document erasure setting are set in the undesirable relationship, it can not be denied that the failure image is outputted. Further, in the case where the setting of the previous apparatus user is saved and it is used as it is, when the background density of the document S is different, there is also a case where the failure image is outputted.

However, in the case of the specific document, when, for example, the framing is too small and it is not-relieved document (mourning post card) even by the method as described by using FIG. 13, by the manual setting, there is a possibility that, inversely, the failure is generated. Accordingly, as the apparatus, not only the automatic setting but the manual selection means which can be manually set is also necessary. The display example shown in FIG. 9 is displayed including also such the case.

As described above, in the copier 1 in the present embodiment, because, by the adequate threshold level THL calculation, the optimum outside of the document erasure method is automatically surely selected and set, even for any document S (the density is low, or high), the realization of the outside of the document erasure function can be correctly attained.

In this connection, the operation and effect as described above can not only be received by applying them to the copier 1 as in the present embodiment, but, for example, also in a facsimile device (image processing apparatus), it can be applied in the same manner. That is, when it is applied to the facsimile device, because the outside of the document erasure function is accurately operated for the document which is the transmission object, on the transfer sheet P outputted on the remote side, the image formation with the black solid output is not conducted. Further, other than the above facsimile device, the present invention can be naturally applied also to a composite machine (image processing apparatus) in which the copy function, facsimile function, and printer function are mounted.

Following that, as a modification of the present embodiment, relating to the setting of the above threshold level THL, an embodiment considering the external light will be described below.

In the present embodiment, the histogram data is used for the automatic setting of the threshold level THL, and in order to obtain a sure index therein, it is considered that the sky shot is conducted. However, when such the sky shot is conducted, it can not be avoided that the external light is incident to the CCD image pick-up apparatus 17. Then, the influence of this external light is the case where the document S is the darker document, and when the threshold level THL is determined, there is a case where a problem which can not be disregarded is generated.

Figure 16:
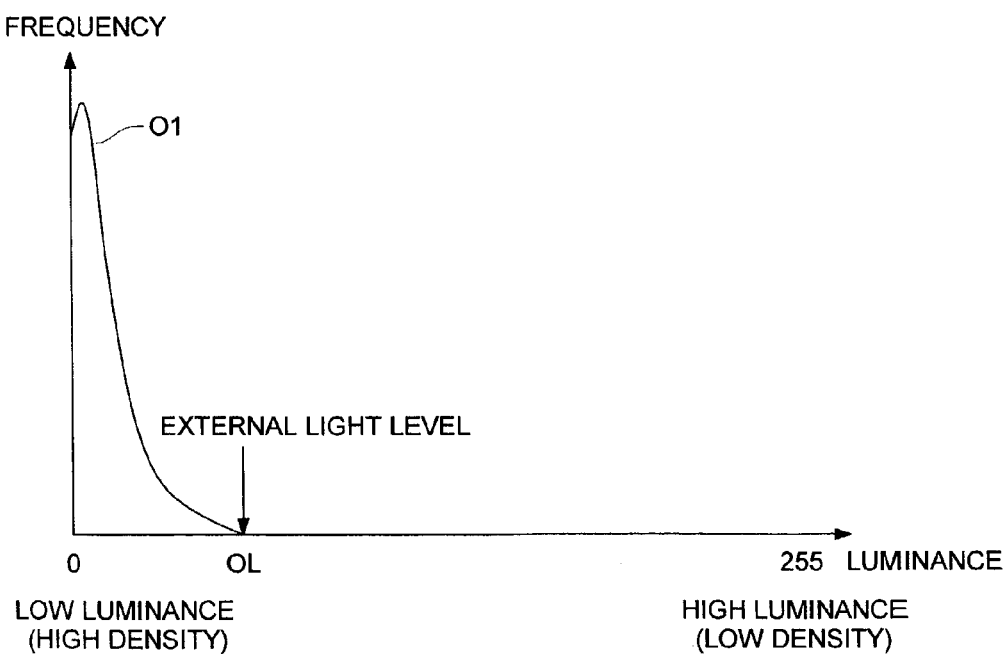
FIG. 16 is a graph showing the histogram data example acquired relating to the external light.

More specifically, when the histogram data relating to the external light is acquired, it becomes, for example, the data as shown in FIG. 16. As can seen when FIG. 16 and FIG. 17 in which FIG. 12 is shown again, are compared to each other, the difference between the level (luminance value) of the external light and the level (luminance value) of the background peak of the document S is very small, and the setting of the adequate threshold level THL is more difficult.

Figure 17:
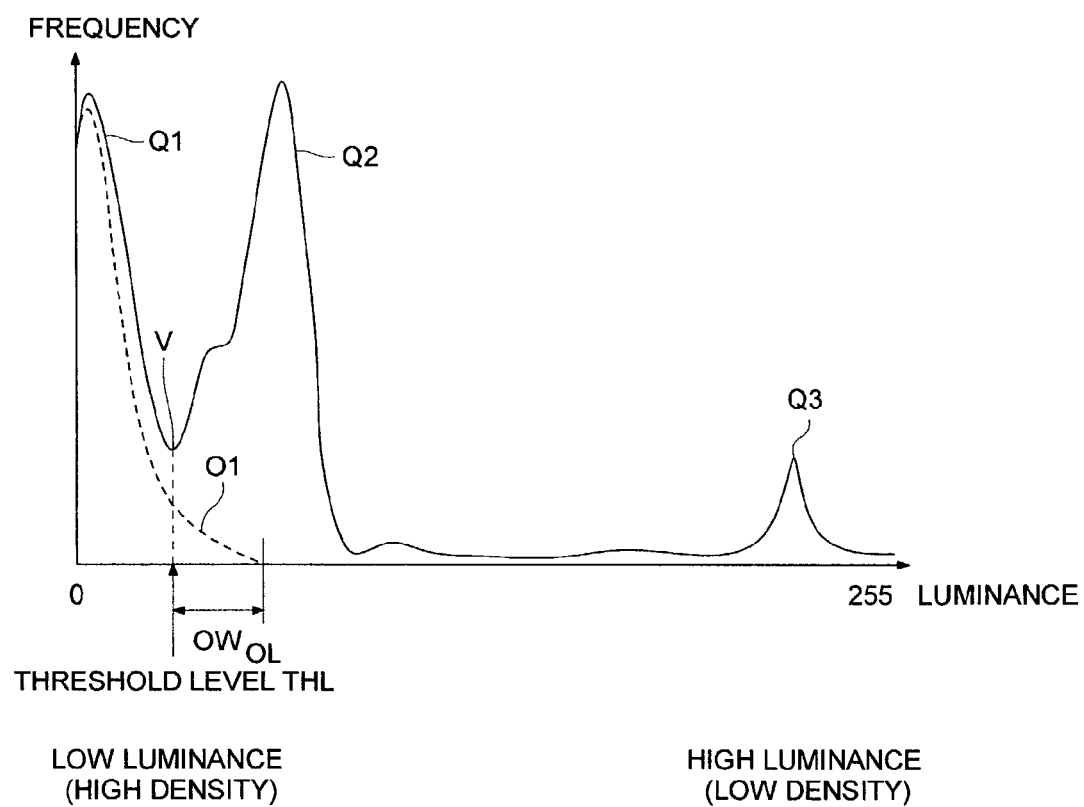
FIG. 17 is an illustration for explaining an influence affected by the external light in the threshold level setting.

For example, in FIG. 17, when the threshold level THL according to the foot or valley (under peak) is set, under the condition that the range OW in which the influence of the external light is affected is so-called "taken in", the document area SR is recognized. That is, because the area including an unnecessary portion which should be originally recognized as the outside document area NSR is recognized as the document area SR, the image formation can not be adequately conducted.

Figure 18:
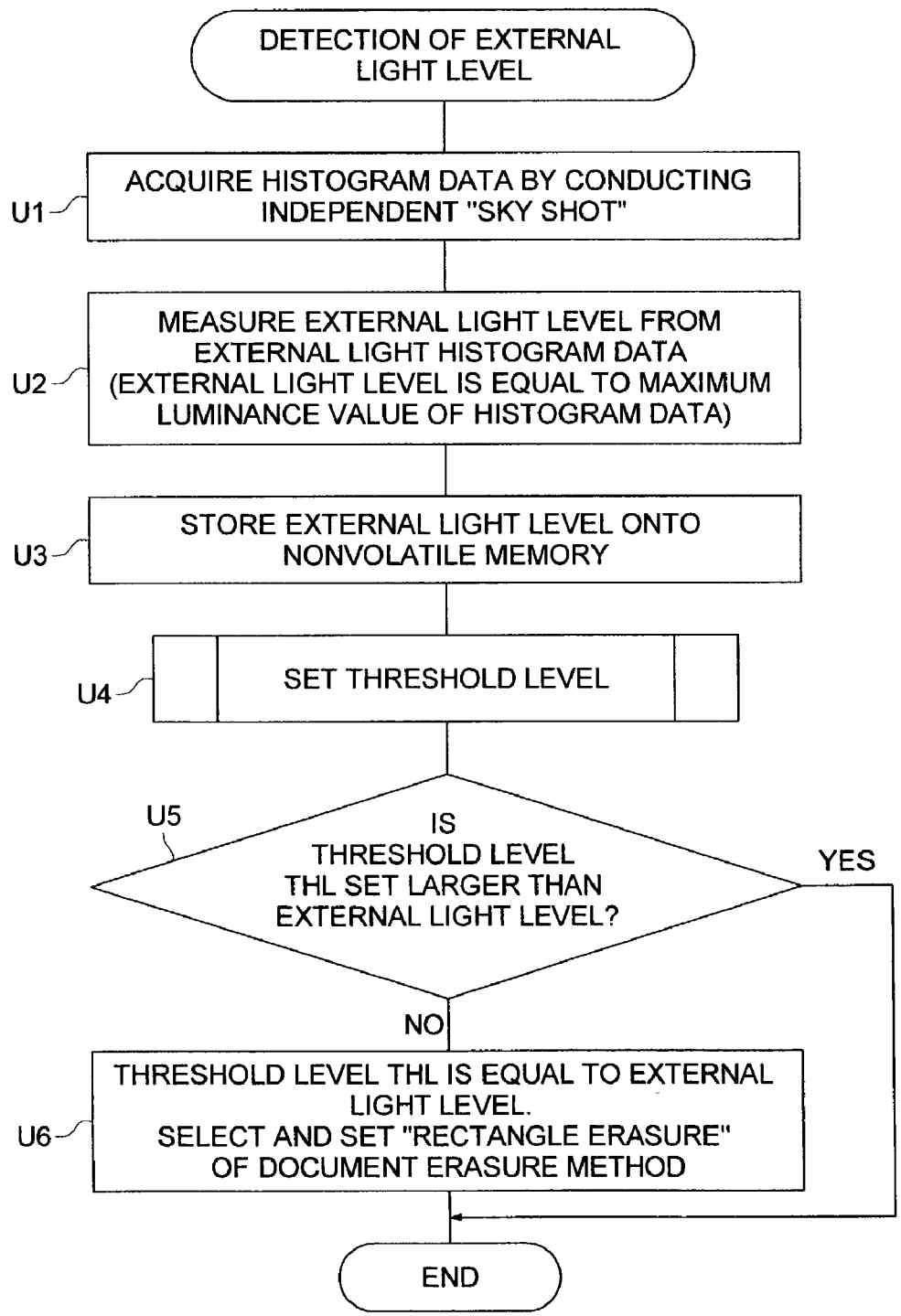
FIG. 18 is a flow chart showing the flow of the processing according to the external light level detection.

Then, in order to cope with such the disadvantage, the processing as shown in, for example, FIG. 18 may be conducted. Initially, as shown in the step U1 in FIG. 18, the light source 12 is scanned (single sky shot) under the condition that the document S is not placed on the platen glass 11, and the histogram data relating to the external light is acquired. This is acquired as the data as shown in FIG. 16 which is referred to already.

Next, as shown in the step U2 in FIG. 18, in this histogram data, the measurable maximum luminance value is confirmed, and this is stored in the non-volatile memory JVN as the "external light level OL" (step U3 in FIG. 18).

In the manner as described above, after the external light level OL is acquired, as shown in the step U4 in FIG. 18, the threshold level THL setting is conducted. This setting itself may be, as described above, the automatic setting according to the histogram data, or manual setting. Further, when the automatic setting is conducted, it can be set by the above-described various methods such as the method according to the peak or the foot.

Then, the thus set threshold level THL, as shown in the step U5 in FIG. 18, is compared to the above-acquired external light level OL. When the threshold level set herein is larger than the external light level OL, the threshold level THL as set as it is, is confirmed, and when it is not so, as shown in the step U6 in FIG. 18, the set threshold level THL is disregarded, and the new threshold level THL which coincides with the external light level OL is set. Further, in this case, because the new threshold level THL is set higher than the actual luminance value of the background of the document S, it is necessary that it is not compared to the rectangle erasure threshold level, and the rectangle erasure is automatically selected and set.

As can be seen from above, the external light level OL has the operation to form the lower limit of the threshold level THL. Then, in this manner, it is clear the failure as described above is avoided. That is, because the threshold level THL is set by the luminance value certainly larger than the external light level OL shown in FIG. 17, there is no case where, originally, although it should be recognized as the outside document area NSR, it is recognized as the document area SR.

Further, in the case where, in the calculation of the threshold level THL for the outside of the document erasure automatic setting, it is repeated that the luminance value is scanned, and the difference of the frequency is acquired, when the luminance value becomes lower than the external light level OL before it is lower than the specified difference value, it is found in the above description that the background density of the document S is sufficiently darker. That is, when the luminance value becomes lower than the external light level OL, the outside of the document erasure automatic setting may be set to the rectangle erasure.

In this connection, the processing relating to the above external light level OL is preferable when it is set so as to be conducted by pressing the external light level OL setting button 95 as shown in, for example, FIG. 9. In this case, it can be structured in such a manner that, when the external light level OL is not acquired yet, the processing from the step U1 in FIG. 18 is conducted, and when it is acquired already, the processing from the step U4 in FIG. 18 is conducted. Further, in the former case, when the document S is placed on the platen glass 11, it may be structured in such a manner that, to the apparatus user, it is urged that the document S is removed from on the platen glass 11, by the message displaying this on the LCD touch panel 90 (to conduct the individual sky shot).

The supplement item relating to the present invention which is not described in the above embodiment will be described below.

Figure 21:
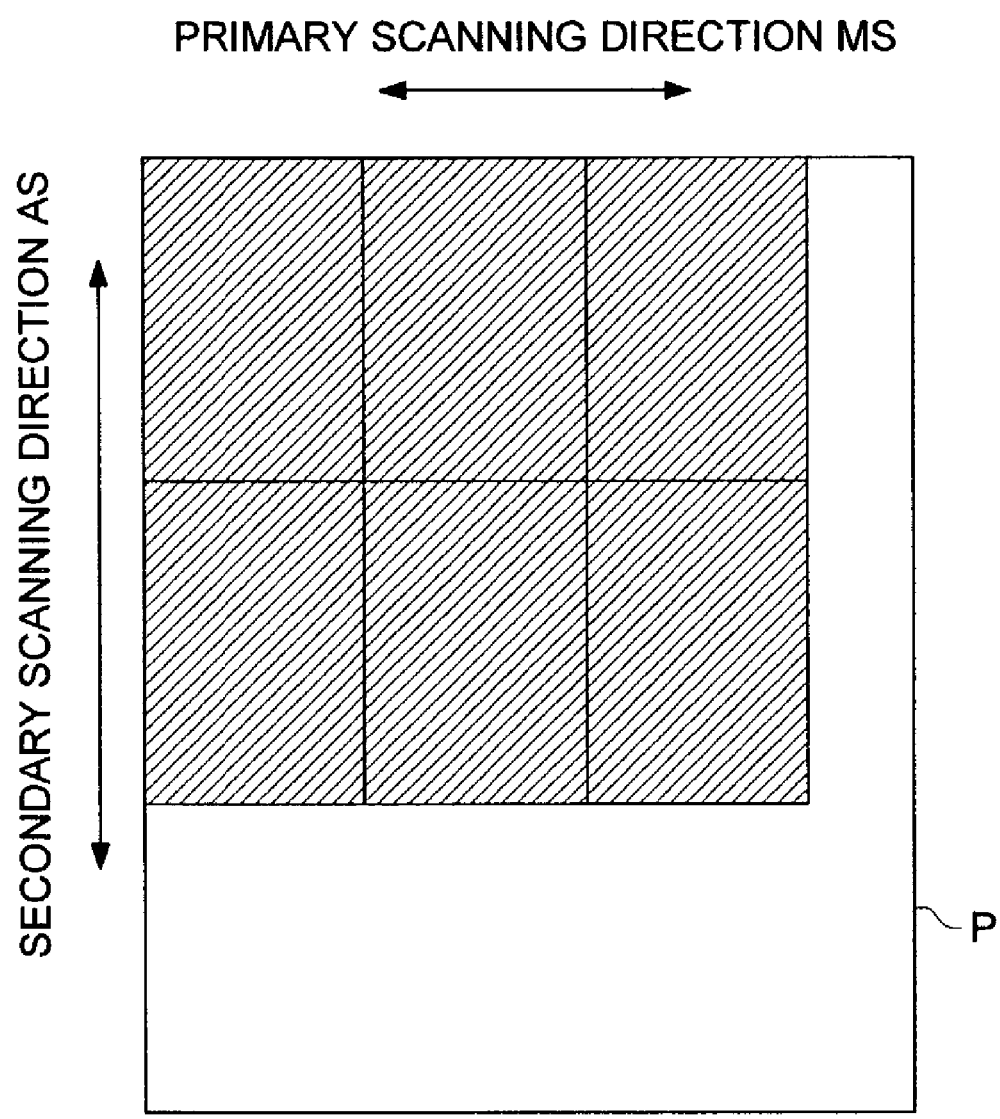
FIG. 21 is an illustration for explaining the repeat function.

Initially, in the present invention, the realization of the correct outside document erasure function through the adequate threshold level THL setting as described in the above embodiment, can be applied when so-called "repeat function" or "centering function" is conducted. Herein, the repeat function means, as shown in FIG. 21, a function by which the image formed on the document S is image formed on a sheet of the transfer sheet P in a plurality of alignments or repeatedly, and the centering function means a function by which the image formed on the document S is image formed onto the center of the transfer sheet P. The former is used, for example, for the purpose of making the name card, and the latter is used, for example, for the purpose of making the binding margin. In this connection, for also any function, there is a case where, in the document image data, for example, the adequate reduction is conducted.

Figure 22:
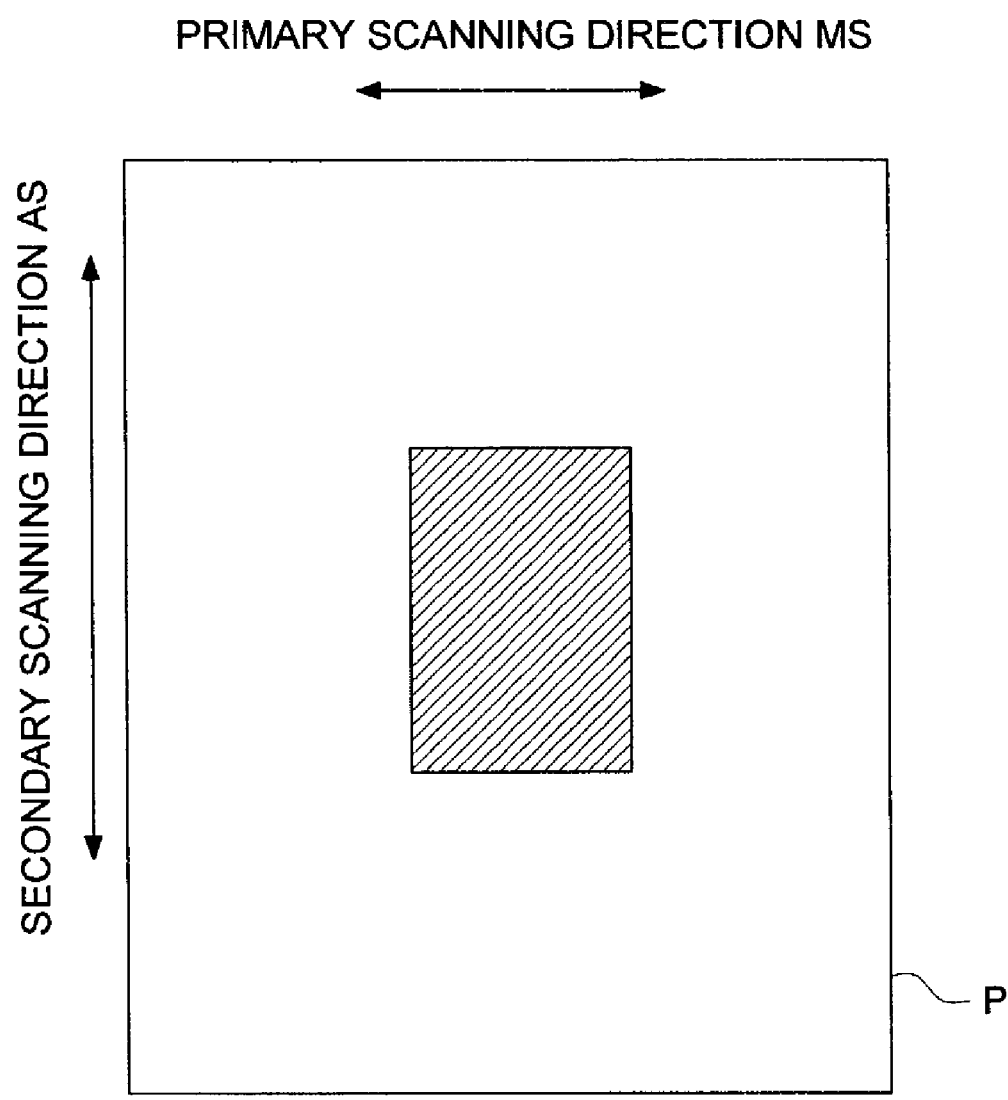
FIG. 22 is an illustration for explaining the centering function.

In this case, the correct recognition of the range of the image formed on the document S serves to the realization of the effective repeat function or centering function. This is clear when refers to FIG. 21 and FIG. 22, and for example, in FIG. 21, when the document image including the outside document area NSR is image formed with a plurality of rows, the appearance is bad, and further, the number of image arrangement rows in the limited transfer sheet P area is reduced. Further, in FIG. 22, in order to conduct the correct centering, it is not preferable that the document image in which the outside document area NSR is included, is used.

Accordingly, in the case where such the repeat function or centering function is conducted, when the correct outside of the document erasure function through the adequate threshold level THL as described in the above embodiment, is applied, the more effective repeat function or centering function can be realized.

In this connection, the above centering function can be considered as a kind of "document position correction function". Herein, the wider conceptual document position correction function means that, it is not limited to the centering, but the function by which the setting by which, for example, 25 mm from the transfer sheet P right side is made a margin, can also be conducted. In this connection, also in such the document position correction function, it is clear that the above discussion is valid for it as it is.

Further, in the above description, it is described for the HD scanning for obtaining the histogram data, and the execution of the pre-scanning for setting the document area SR, and further, also described that the acquirement of the necessary data by the execution of both scanning can be acquired at once, for example, at the time of the HD scanning.

In this connection, other than the scanning as described above, in the conventional copier, as described at the time of the description of the operation of the gamma curve processing circuit J4, there is a case where the EE scanning is conducted for the purpose of the detection of the of the density of the document S.

In the present invention, at the time of this EE scanning, the data obtaining at which the HD scanning or pre-scanning aims, may be conducted at once. In this connection, generally, there is a case where the range of the document S whose density is measured by the EE scanning is, for example, when the document is placed on the platen glass, made within the range of 20 mm inside the document, or when the automatic document conveying section (RADF), not shown, is used, it is made the range of the leading edge portion of the document (for example, 1.5–2.9 mm), however, as described above, in order to attain the object of each kind of scanning at once, generally speaking, it will be necessary that the entire range of the document S is scanned.

Further, in the above embodiment, as described herein, when the outside of the document erasure function is conducted, it is made a presumption that any scanning is conducted, but the present invention is not limited to such the mode. For example, according to the document image data about a some document S temporarily stored in the image memory JM shown in FIG. 5, the outside of the document erasure function may be conducted. Of course, it is natural that the acquirement of the histogram data can be conducted according to the document image data.

As described above, according to the image processing apparatus of the present invention, the adequate setting of the threshold level which is a reference to distinguish the document area from the outside document area is possible, and further, the selection of the adequate outside of the document erasure method can be conducted from the set threshold level, thereby, the realization of the accurate outside of the document erasure function can be attained.

What is claimed is:

1. An image processing apparatus comprising:
   an image reading section for reading an image including a document;
   an image processing section for distinguishing and recognizing an area in the image where the document is present and an area in the image where the document is absent, with reference to an area recognition threshold value based on an output of the image reading section;
   an erasing section for erasing a portion of the image output from the image reading section corresponding to the area where the document is absent, wherein the erasing section is operable to perform a rectangle erasing function in which an area inside a minimum quadrilateral including the document is considered to be a document area, and an oblique angle erasing function in which an area formed by both edges of each primary scanning line of the document read by the image reading section is considered to be the document area; and
   a manual selector for manually selecting one of: (i) the rectangle erasing function, (ii) the oblique angle erasing function, and (iii) an instruction to perform an automatic selection of one of the rectangle erasing function and the oblique angle erasing function based on a rectangle erasing threshold value and a document background level value.

2. The image processing apparatus of claim 1, wherein the document background level value is automatically set according to a characteristic obtained by the output of the image reading section.

3. The image processing apparatus of claim 2, wherein the image reading section comprises a light source for emitting light to be projected onto the document, and a photoelectric conversion device for converting light reflected by the document into an electric signal, and wherein the output of the image reading section is a luminance data value which is an output of the photoelectric conversion device, and the characteristic corresponds to histogram data in which frequency in accordance with one of the luminance data value and a density data value which is converted from the luminance data value is totalized.

4. The image processing apparatus of claim 3, wherein the automatic selection selects the oblique angle erasing function when the document background level value is judged to be lighter than the rectangle erasing threshold value, and the automatic selection selects the rectangle erasing function when the document background level value is not lighter than the rectangle erasing threshold value.

5. The image processing apparatus of claim 4, wherein the automatic selection automatically selects the rectangle erasing function when the document background level value, which is set automatically from the histogram data, is set beyond an external light level obtained based on the output of the photoelectric conversion device generated when external light is incident, or when the setting is assumed.

6. The image processing apparatus of claim 5, wherein the document background level value is automatically set according to one of the luminance data value relating to a peak observed in the histogram data and the density data value.

7. The image processing apparatus of claim 6, wherein the peak is a peak which appears as a first place peak, except the peak which appears by a sky shot, in the peak observed in the histogram data.

8. The image processing apparatus of claim 6, wherein the peak is a peak on a side at which the luminance value is low or the density is high, of the peak which appears as a first place peak and a second place peak, except the peak which appears by a sky shot, in the peak observed in the histogram data.

9. The image processing apparatus of claim 6, wherein the document background level value is set from a difference value of frequency and a specified difference value which are calculated according to the luminance data value or density data value relating to the vicinity of the peak observed in the histogram data.

10. The image processing apparatus of claim 9, wherein the automatic selection automatically selects the rectangle erasing function when the document background level value set from a difference value of frequency and a specified difference value calculated on the basis of the luminance data value or the density data value relating to the vicinity of the peak observed in the histogram data in which frequency thereof is totalized in accordance with either the luminance data value which is an output of the photoelectric conversion device or the density data value which is converted from the luminance data value, is not set.

11. The image processing apparatus of claim 9, wherein the document background level value is set on the basis of a result of comparison between the difference value of frequency and the specified difference value calculated according to the luminance data value or the density data value relating to the vicinity of the peak observed in the histogram data.

12. The image processing apparatus of claim 6, wherein the document background level value is automatically set by using more than one of the maximum point, minimum point, inflection point, foot in the vicinity of the peak, and under peak, employing the peak or without employing the peak.

13. The image processing apparatus of claim 6, wherein the area recognition threshold value and the document background level value are the same.

14. The image processing apparatus of claim 4, further comprising:

a repeat device having a repeat function to extract the document area and to repeatedly form a plurality of document images on the output image, or a correction device having a document position correction function to extract the document area and to move the document image, wherein the repeat device and the correction device have the same function as that of the image processing section.

15. The image processing apparatus of claim 4, wherein when an output of the image reading section is obtained by scanning the document by the light source in a predetermined direction, information necessary for the acquirement of the characteristic obtained by the output of the image reading section, automatic setting of the threshold value and both of the distinction and recognition in the image processing section, is acquired by only one execution of the scanning.

16. The image processing apparatus of claim 1, further comprising a judgment section for judging whether or not the document background level value is smaller than the rectangle erasing threshold value, wherein when the document background level value is smaller than the rectangle erasing threshold value, the judgment section selects the rectangle erasing function, and when the document background level value is larger than the rectangle erasing threshold value, the judgment section selects the oblique angle erasing function.

17. An image processing method comprising:

reading an image including a document by an image reading section;

distinguishing and recognizing an area in the image where the document is present and an area in the image where the document is absent, with reference to an area recognition threshold value based on an output of the image reading section;

erasing a portion of the image output from the image reading section corresponding to the area where the document is absent, by an erasure section, wherein the erasure section is operable to perform a rectangle erasure function in which an area inside of a minimum quadrilateral including the document is made a document area, and an oblique angle erasure function in which an area formed by both edges of each primary scanning line of the document read by the image reading section is made the document area; and automatically selecting one of the rectangle erasure function and the oblique angle erasure function based on a rectangle erasure threshold value and a document background level.

18. A computer-readable recording medium having a program stored thereon that is executable by a computer to cause the computer to execute an image processing method comprising:

reading an image including a document by an image reading section;

distinguishing and recognizing an area in the image where the document is present and an area in the image where the document is absent, with reference to an area recognition threshold value based on an output of the image reading section;

erasing a portion of the image output from the image reading section corresponding to the area where the document is absent, by an erasure section, wherein the erasure section is operable to perform a rectangle erasure function in which an area inside of a minimum quadrilateral including the document is made a document area, and an oblique angle erasure function in which an area formed by both edges of each primary scanning line of the document read by the image reading section is made the document area; and automatically selecting one of the rectangle erasure function and the oblique angle erasure function based on a rectangle erasure threshold value and a document background level.

* * * * *